US009094873B2

(12) United States Patent
Lu et al.

(10) Patent No.: US 9,094,873 B2
(45) Date of Patent: Jul. 28, 2015

(54) CLASSIFIED RELATION NETWORKING OPTIMIZATION PLATFORM IN OPEN WIRELESS ARCHITECTURE (OWA) MOBILE CLOUD TERMINAL DEVICE

(76) Inventors: Wei Lu, Cupertino, CA (US); Dexi Lu, Cupertino, CA (US); Jianhong Hu, Cupertino, CA (US); Michael Lu, Cupertino, CA (US)

( * ) Notice: Subject to any disclaimer, the term of this patent is extended or adjusted under 35 U.S.C. 154(b) by 140 days.

(21) Appl. No.: 13/470,720

(22) Filed: May 14, 2012

(65) Prior Publication Data

US 2012/0224694 A1    Sep. 6, 2012

(51) Int. Cl.
| | |
|---|---|
| H04W 12/02 | (2009.01) |
| H04W 12/06 | (2009.01) |
| H04W 12/04 | (2009.01) |
| H04L 9/08 | (2006.01) |
| H04W 28/24 | (2009.01) |
| H04L 29/06 | (2006.01) |
| H04W 4/20 | (2009.01) |
| H04W 88/06 | (2009.01) |

(52) U.S. Cl.
CPC ........... *H04W 28/24* (2013.01); *H04L 63/0876* (2013.01); *H04W 4/206* (2013.01); *H04W 12/02* (2013.01); *H04W 12/06* (2013.01); *H04W 88/06* (2013.01)

(58) Field of Classification Search
USPC ............ 370/210, 259, 331; 455/183.2, 187.1, 455/556.2
See application file for complete search history.

(56) References Cited

U.S. PATENT DOCUMENTS

| | | | |
|---|---|---|---|
| 7,093,137 | B1 * | 8/2006 | Sato et al. ................... 713/193 |
| 2004/0203594 | A1 * | 10/2004 | Kotzin et al. ................ 455/411 |
| 2005/0025337 | A1 * | 2/2005 | Lu et al. ...................... 382/100 |
| 2005/0159123 | A1 * | 7/2005 | Lu .............................. 455/183.2 |
| 2007/0105589 | A1 * | 5/2007 | Lu .............................. 455/556.2 |
| 2007/0123297 | A1 * | 5/2007 | Chan et al. ................. 455/550.1 |
| 2008/0146178 | A1 * | 6/2008 | Lu et al. ..................... 455/187.1 |
| 2008/0304404 | A1 * | 12/2008 | Lu et al. ...................... 370/210 |
| 2009/0023453 | A1 * | 1/2009 | Hu et al. .................... 455/452.1 |
| 2010/0103817 | A1 * | 4/2010 | Takayanagi et al. ......... 370/230 |
| 2010/0142482 | A1 * | 6/2010 | Lu et al. ...................... 370/331 |
| 2010/0238840 | A1 * | 9/2010 | Lu et al. ...................... 370/259 |
| 2011/0191475 | A1 * | 8/2011 | Sudit ........................... 709/226 |
| 2011/0208877 | A1 * | 8/2011 | Ikeda et al. ................. 709/238 |
| 2011/0231407 | A1 * | 9/2011 | Gupta et al. ................ 707/748 |
| 2012/0058742 | A1 * | 3/2012 | Razoumov et al. .......... 455/406 |
| 2012/0102551 | A1 * | 4/2012 | Bidare ........................... 726/4 |
| 2012/0159540 | A1 * | 6/2012 | Park et al. ..................... 725/34 |
| 2013/0238681 | A1 * | 9/2013 | Oka et al. .................... 708/250 |

* cited by examiner

*Primary Examiner* — Andrew Nalven
*Assistant Examiner* — Huan V Doan

(57) ABSTRACT

A fully user-centric mobile relation networking management of business networking, personal networking and social networking for mobile terminal device with networking services adaptively and intelligently optimized by converged wireless connections based on open wireless architecture (OWA) mobile cloud infrastructure with QoW (Quality of Wireless connection) control through OWA Operating System (OS) to enable highly secured relation networking for mobile business and personal networking users.

17 Claims, 7 Drawing Sheets

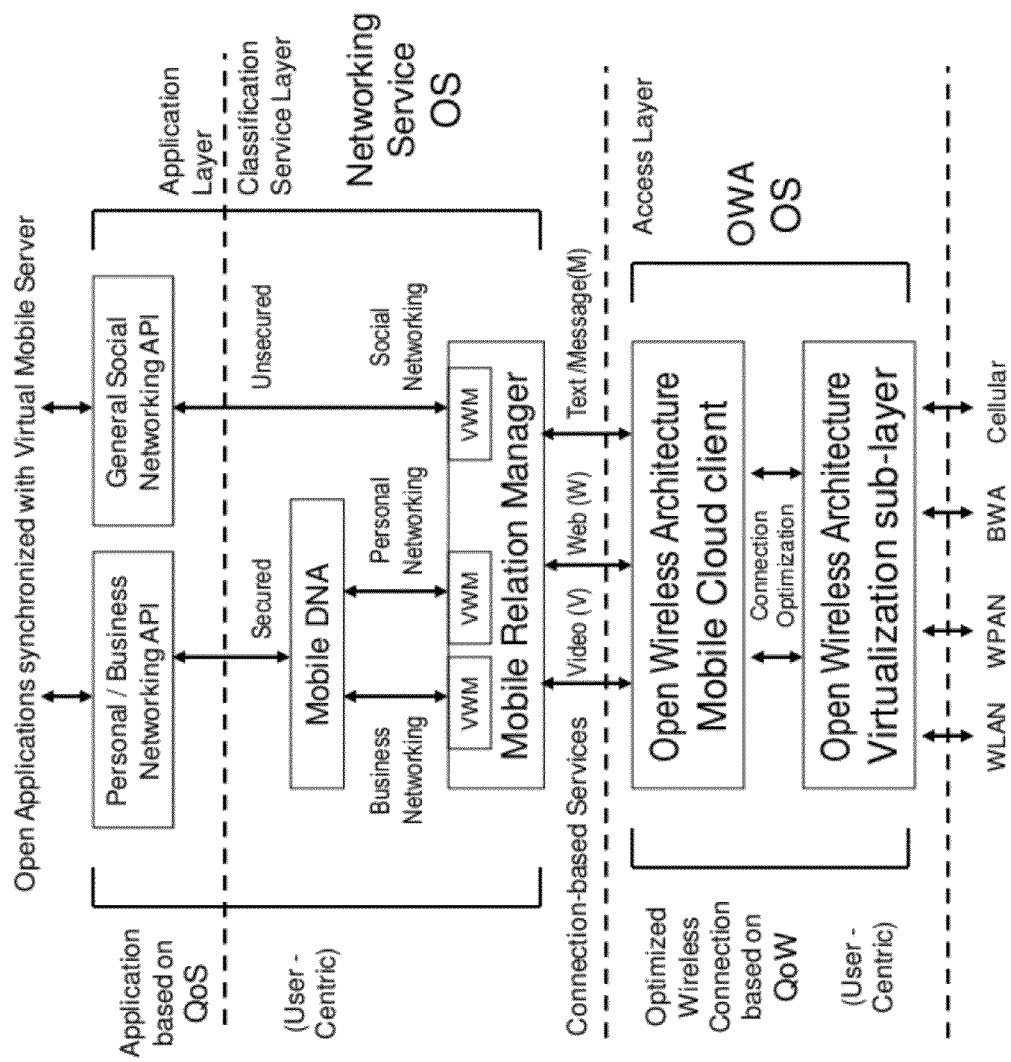
FIG. 1 Classified Relation Networking Optimization Platform in OWA Mobile Cloud Terminal

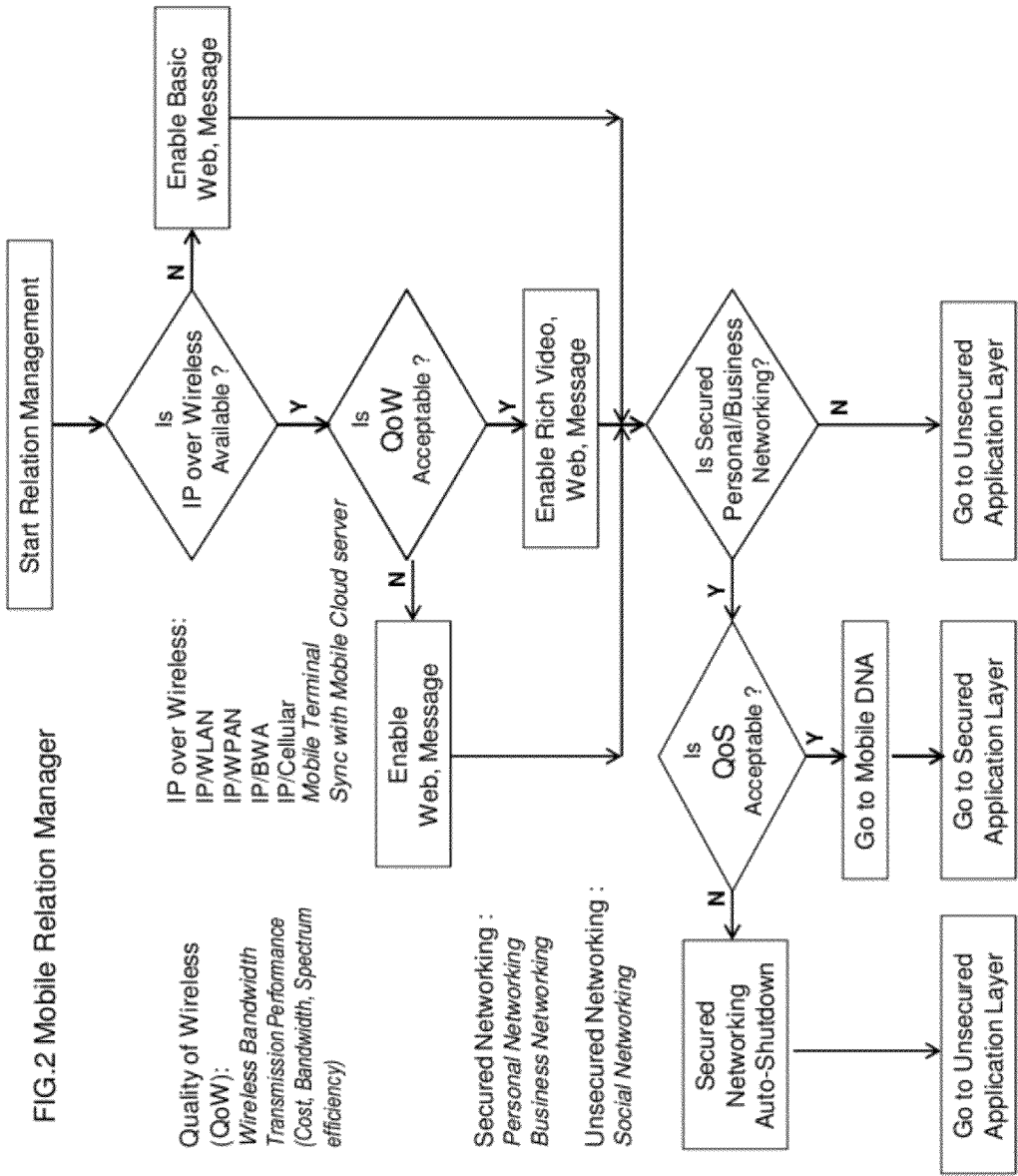
FIG.2 Mobile Relation Manager

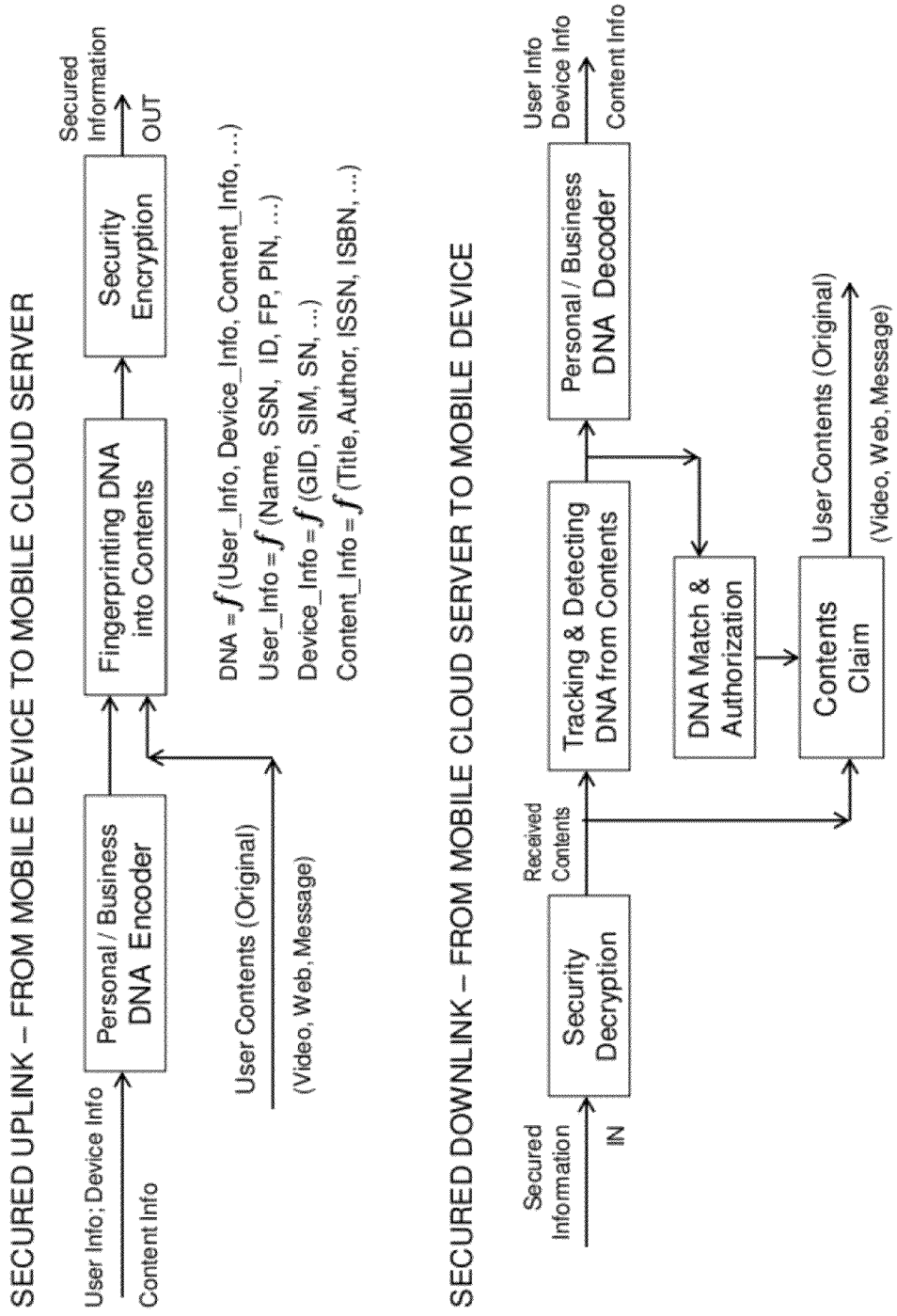
FIG.3 Mobile DNA Unit

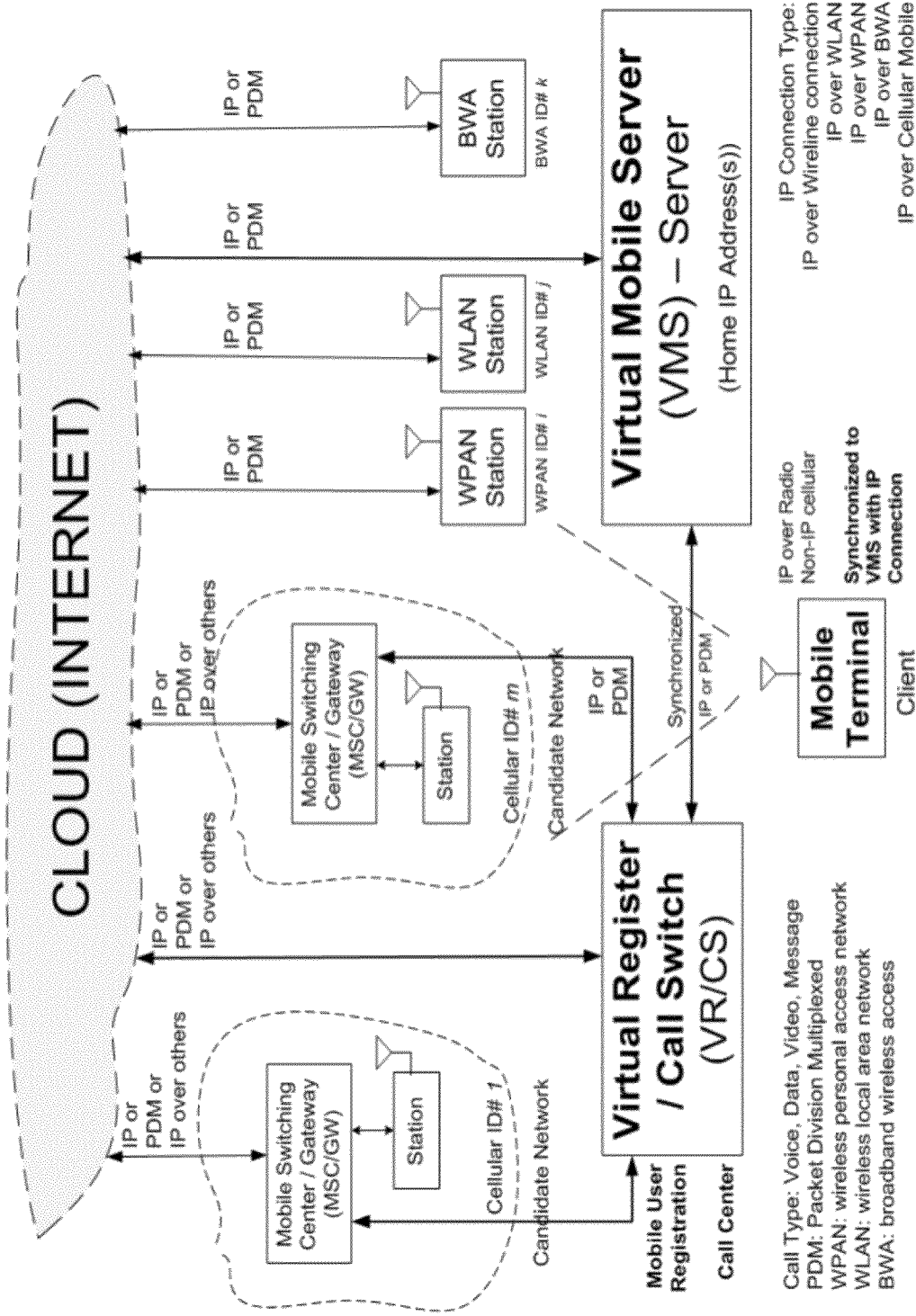
FIG.4 Mobile Cloud Infrastructure

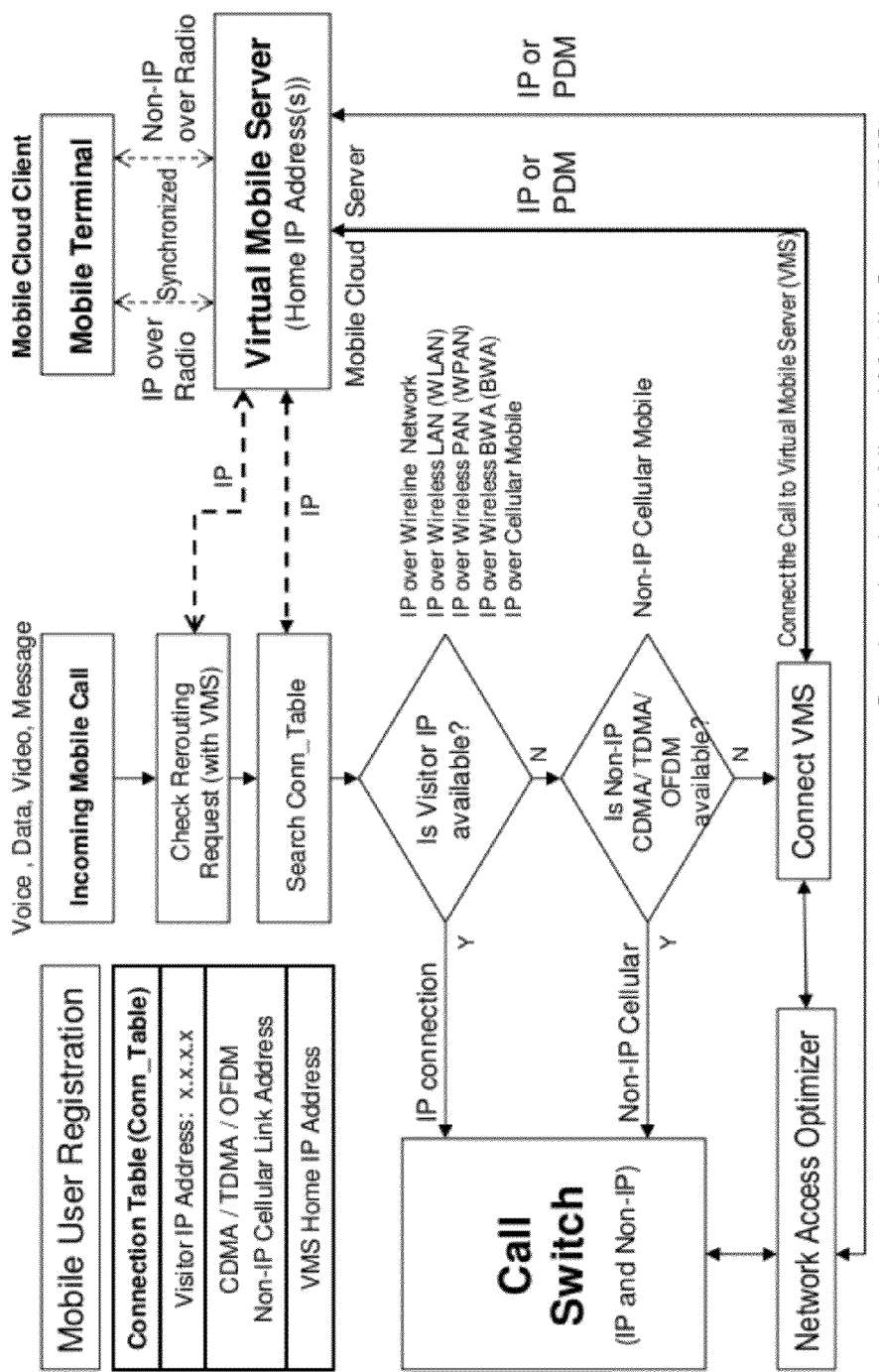
FIG.5 Call Processing Management in Virtual Register and Call Switch (VR/CS) with VMS

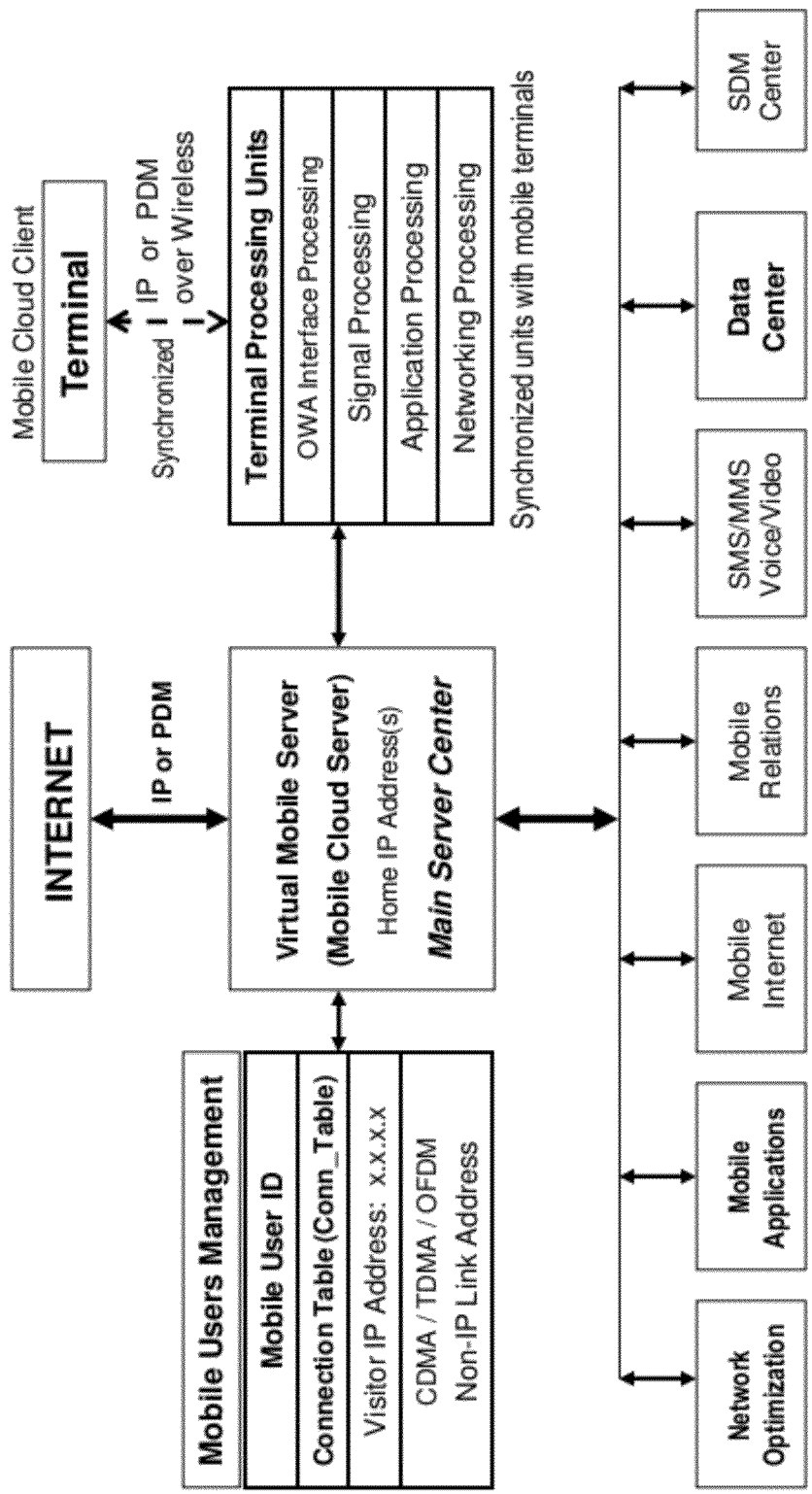
FIG.6 Virtual Mobile Server as Mobile Cloud Server

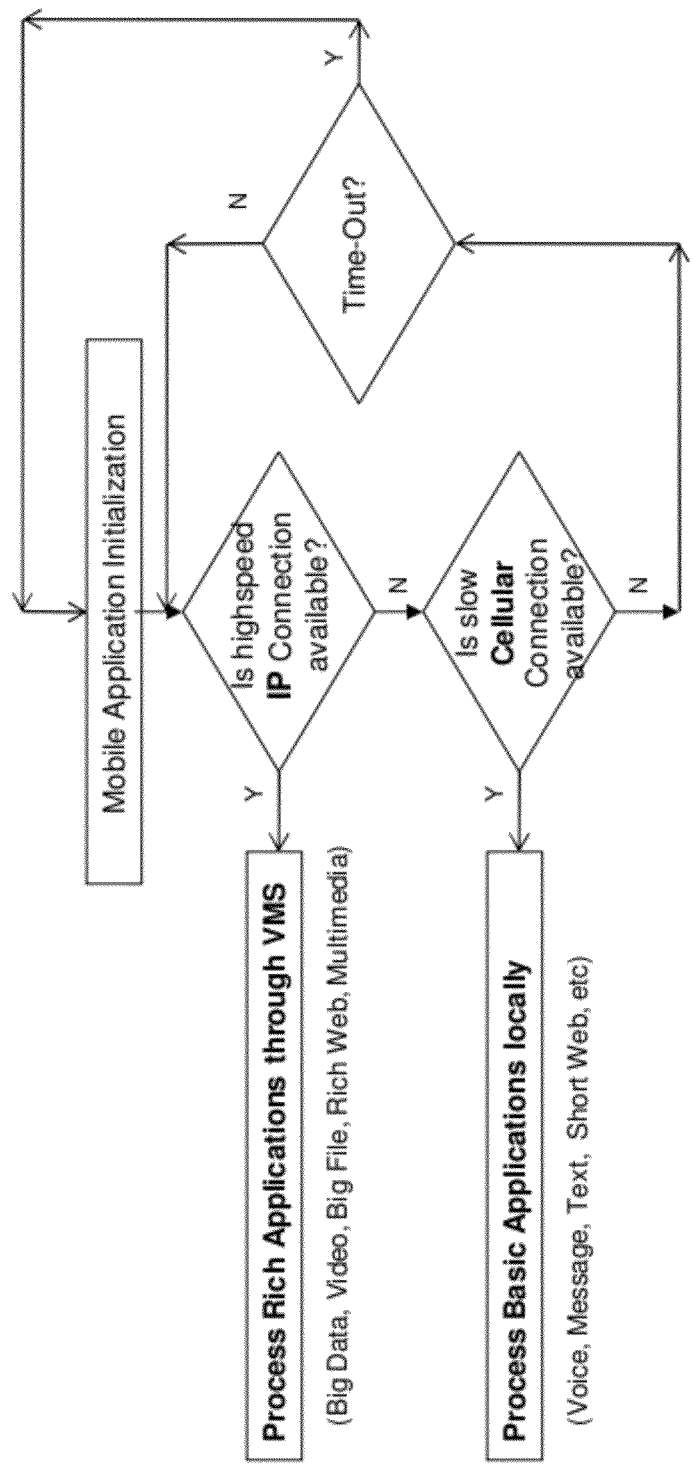
FIG. 7 OWA Application Optimizer in Mobile Cloud Terminal System

CLASSIFIED RELATION NETWORKING OPTIMIZATION PLATFORM IN OPEN WIRELESS ARCHITECTURE (OWA) MOBILE CLOUD TERMINAL DEVICE

BACKGROUND OF THE INVENTION

1. Field of the Invention

This invention relates to a fully user-centric mobile relation management of business networking, personal networking and social networking for mobile terminal device with services adaptively and intelligently optimized by converged wireless connections based on open wireless architecture (OWA) mobile cloud infrastructure. By introducing QoW (Quality of Wireless connection) through OWA Operating System (OS), Mobile Relation Manager can ensure optimally secured business networking and personal networking for mobile users with mobile devices which are truly user-centric instead of carrier-centric.

2. Description of the Related Art

On-line social networking is booming up across the global from wireline networks to wireless networks with various services from text message to web pages (including photo, images, text, file, short video) to videos (non-short video).

Conventional social networking is limited to the desktop or laptop through wireline networks. As mobile device gets more and more popular, mobile users have become the driving forces for on-line social networking business.

However, when evolving from wireline networks to wireless mobile networks, lots of technical issues emerge to the performance of the social networking platform. These critical technical issues include:

1. Wireline's transmission bandwidth is basically unlimited in some extend, but wireless bandwidth is both very expensive and technically very limited;
2. Wireline's social networking services are unlimited from text message to web to video because no limitation in bandwidth, but wireless services are fully limited and impossible to have full services anytime and in any environment;
3. Mobile terminal is in fast fading propagation environment and wireless mobile bandwidth is unstable when users move to different areas which cause the service quality changing frequently. Therefore, mobile services are very much depending on the underlying wireless connections in different service areas and different wireless transmission technologies;
4. Wireless connections are much unsecured in general compared to wireline networks, and some social networking information such as personal and business information is very critical for the users, hence extra efforts must be taken to ensure security measures for mobile users' services in the mobile relation networking business.

Therefore, the mobile social or relation networking platform must provide the following technical solutions to ensure optimal performance for mobile users:

1. The bandwidth of wireless connections must be optimized to ensure the quality of services for the mobile terminal device;
2. The wireless connections must be optimized among different multiple wireless transmission technologies while securing the seamless mobility features for mobile users at the same time;
3. The optimized wireless connections must be cost-effective for the mobile users which is truly user-centric instead of carrier-centric;
4. The mobile relation networking services must be optimized and scheduled by the underlying wireless connections for the mobile devices of mobile users;
5. The mobile relation networking services must be classified into secured business relation networking (hereby called business networking), secured personal relation networking (hereby called personal networking) and unsecured general social networking (hereby called social networking) in the wireless mobile domains because of unstable wireless propagation modeling of radio transmission;
6. The classified relation networking optimization platform must adapt to the commercial social networking platforms such as Facebook, Google, etc with open networking API (application program interface).

All of the current and conventional social networking platforms including Facebook, Google+, LinkedIn, Myspace, Youtube, Twitter, etc are not optimized for mobile devices of mobile users because of the aforementioned reasons and problems. The conventional social networking is developed for the wireline networking users instead of the mobile wireless users. Furthermore, the conventional social networking does not optimize the networking services based on the networking bandwidth because the wireline networking has no much limitation in networking bandwidth and the networking environment is very stable in the wireline networking. Therefore, the conventional social networking for wireline users, such as Facebook, can support full services (video, web, message, etc) all the time in the form of user posted message, video, photo, images, file, webpages, etc, and commercial advertisements (images, photos, video, files, etc).

However in wireless mobile networking, the mobile terminal devices of mobile users are in frequent radio fading environment with seamless mobility, the wireless transmission bandwidth is therefore not guaranteed and subject to frequent change which leads to the unstable features of the social and relation networking services of the mobile users.

Though the conventional social networking platforms, such as Facebook, Google, LinkedIn, Twitter, etc, can support mobile devices of mobile users, both the connection and service efficiencies are very low, and the performance is very poor. Furthermore, these conventional social networking platforms do not have secured networking measures for the mobile devices, and so mobile users' social networking information has been widely leaked to and accessed by unauthorized third-parties throughout the wireless social networking platforms (especially the unsecured link between the mobile device and the social networking server). This is definitely not acceptable for some important and confidential business and personal networking information in the mobile relation networking.

The https (secured Hypertext Transfer Protocol) protocol only provides security method in the higher application layer without ensuring the secured transmission in the lower layers including service layer, network layer, MAC (medium access control) layer and physical layer. For mobile wireless transmissions, the most security threats are from the low layers instead of the application layer. Hence, conventional social networking platforms (Facebook, Google, LinkedIn, Apple App Store, etc) do not have such security measures in the mobile wireless transmissions, especially for the future converged multiple air interfaces environment.

As more and more mobile users utilize social networking services in mobile terminal devices, the aforementioned issues have emerged to be the critical problems in the industry, business, community as well as society. In addition, social networking security becomes one of the major concerns of cyberspace security warned by the federal government of United States, especially for business networking and personal networking.

In mobile wireless communications, the purely application-layer encryption (such as web browser's encryption or HTTP (Hypertext Transfer Protocol) encryption) is not enough to protect the security between the communication end points. Security measures must be taken in cooperation with the underlying wireless connection layers. Therefore, multi-layers' security solution comprising access/connection layer, service layer and application layer is required for the mobile relation networking platform.

Therefore, the performance and security of mobile relation networking platform is mostly limited by and dependent upon the underlying wireless connections and transmissions. Hence, open wireless architecture (OWA) mobile cloud infrastructure is the core technology to construct this classified relation networking optimization platform for mobile relation networking users.

Let's introduce the OWA mobile cloud technology first.

Wireless communications comprises a wide range of technologies, services and applications that have come into existence to meet the particular needs of different market sectors and user environments. Different systems can be broadly characterized by:
- content and services offered;
- frequency bands of operation;
- standards defining the systems;
- data rates supported;
- bidirectional and unidirectional delivery mechanisms;
- degree of mobility;
- regulatory requirements; and
- cost.

The service requirements for telecommunications remain the following characteristics:

Speech and SMS (Short Message System):
  This service type requires a peak bit rates up to 16 kbps. In the year 2010 onwards, there will still remain needs for these very low data rate applications of speech and simple message service. In addition to that, some applications in the field of sensor communication and/or low bit rate data telemetry would also be expected for the category, as ubiquitous communications. Most of mobile e-commerce applications would also be categorized in this type.

Multimedia and low rate data:
  This service type at a data rate of less than 144 kbps should also be considered, taking into account the compatibility with 3G and 2G data communication applications.

Medium multimedia:
  This type support a peak bit rate of up to 2 Mbps. This type would be required to sustain the compatibility with the 3G applications.

High multimedia:
  This type should be considered in order to accommodate high data rate applications, including multi-media video streaming services, which are provided with broadband service in fixed wired communication systems or with broadband wireless access systems.

Super high multimedia:
  This type should also be considered in order to accommodate super high data rates multi-media applications, which are currently provided with Fibre-to-the-Home (FTTH) services in case of wired communication systems.

Currently, these services require different communication devices with different connection facilities that the users need frequent switch between various terminals at home, office and in other environments.

A service usage pattern may be categorized according to an area where users exploit similar services and expect similar quality of service:
  Home
  Office
  Public area
  Wide area In many countries, wireline Internet access in Home, Office and Public Area becomes very popular and affordable. Meanwhile, WLAN (wireless local area network) access is evolving rapidly in these domains.

Mobile communications have evolved rapidly on the worldwide basis. But when we look back at the wireless mobile communication history, two major issues remain unsolved:
1. The mobile wireless terminal architecture is too closed.
2. The mobile wireless terminal system is too complicated.
3. The mobile wireless services are too carrier-centric, not user-centric.

The wireless transmission theory of our research tells us that no single wireless transmission technology can provide both broadband high-speed radio transmission and seamless fast mobility capability in a mobile fast-fading propagation model environment unless we reduce the mobile network capacity tremendously—referred to as LU's Laws in the industry.

Our research shows that when the transmission bandwidth is enough, the information processing consumes much more resources and energies than the transmission processing.

In order to solve the above two problems in mobile communications, let us analyze the current situations first.

In many countries, wireline Internet access in home, office and public area becomes very popular and affordable. Meanwhile, WLAN (wireless local area network) access is evolving rapidly in these domains.

Second generation (2G) wireless mobile systems were mainly designed for applications such as voice. Third generation (3G) and especially, fourth generation (4G) mobile system will increasingly be designed as combination of different access technologies to complement each other in an optimum way for different service requirements and radio environments in order to provide a common and flexible service platform for different services and applications.

Access to a service or an application may be performed using one system or may be performed using multiple systems simultaneously or alternatively. Specifically, as will be described within the context of the present invention and has not been addressed in the art, such improved technology could include an integrated and converged communication system which will combine the wireless mobile communication, wireline communication, wireless local area network, broadband wireless access system and Internet into one common platform so that the single Mobile Terminal can operate as a home phone, office phone, mobile phone and open terminal with single user number, which is the unique identifier of this integrated mobile communication terminal.

In future, operators may deploy a mix of technologies that could, at various stages in time and subject to market and regulatory considerations, incorporate cellular, WLAN (wireless local area network), WMAN (wireless metropolitan area networks) or called BWA (broadband wireless access), WPAN (wireless personal access network), digital broadcast, satellite and other access systems as discussed by the present invention. This will require the seamless interaction of these systems in order for the user to be able to receive a variety of content via a variety of delivery mechanisms depending upon the particular terminal capabilities, location and user profile.

Different radio access systems will be connected via the open and flexible core networks. In this way, an individual user can be connected via a variety of different access systems to the networks and services he desires. The integration and convergence between these different access systems in terms of horizontal and vertical handover and seamless service provision with service negotiation including mobility, security and service quality management will be a key requirement.

Due to the different application areas, cell ranges and radio environments, the different access systems can be organized in a layered structure similar to hierarchical cell structures in cellular mobile radio systems. The different layers correspond to the:

Distribution layer: This layer comprises digital broadcast type systems to distribute the same information to many users simultaneously through unidirectional links.

Cellular layer: The cellular layer may comprise several cell layers with different cell size and or different access technologies.

Hot spot layer: This layer may be used for very high data rate applications, very high traffic density and individual links, e.g. in very dense urban areas, campus areas, conference centers, and airports.

Personal network layer: Personal area networks will support short range high-speed direct communication between devices around the users.

Fixed (Wired) layer: This layer includes any fixed wireline access system.

Such an integrated mobile terminal system as provided by the present invention could intelligently converge mobile communications, Internet, wireline communications, wireless LAN, wireless MAN, wireless PAN, etc into an open system platform. Each of these represents a variety of applications, services and delivery mechanisms. These differing information flows are desired by the users to be available regardless of the means and manner of delivery. The most important is, this mobile terminal becomes the All-in-One common personal communicator at both home and office or on-the-move with unified single telephone number.

It is well predicted that 2G (second generation), 3G (third generation in its present state), 4G (fourth generation), 5G (fifth generation), future mobile access and nomadic/local area wireless access elements are considered to be a system as a whole in the future. This converged and integrated communication platform as disclosed by the present invention, rather than separate and single mode of standard, will definitely drive the future telecommunication industry, but with new business model for service providers and operators.

Continuous evolution is foreseen in future mobile terminals, with use of new components, architectures, hardware, software platforms and improved user interfaces together providing increased performance. The key technologies that will enable the future advanced mobile terminals as described in the present invention include:

Open Wireless Architecture (OWA) supporting multiple standards efficiently

Mobile Cloud technology to simplify the mobile terminal architecture

Migrating the service from the carrier-centric to the user-centric platform

Smart antennas and new space/time coding and decoding techniques

High efficiency power amplifiers and filters

Improved RF (radio frequency) modules, allowing higher operating frequencies and improved receiver sensitivity Advances in signal processing, increased processing efficiency Improved battery technology with increased energy density High-performance and low-power signal processing and processor platform based on OWA Integration and convergence with wired terminal A unified global standard of mobile communications becomes extremely difficult and almost impossible. An Open Wireless Architecture (OWA) based converged wireless platform will thus become reasonable and feasible in both business and technology, and therefore ITU (international telecommunication union) IMT-Advanced standardization has been targeting this direction in long run.

Open Wireless Architecture (OWA) technology is one optimal solution for the Fourth Generation wireless and mobile communications (4G) and beyond on the worldwide basis. OWA refers to the open broadband wireless platform that can support diverse wireless and mobile standards, and can converge multiple wireless networks. To achieve this flexibility, OWA focuses on all aspects of a communication system including RF (radio frequency), baseband processing, networking and application segments. The flexibility and adaptability required for the converged open wireless platform can be achieved by defining the open interface parameters for the OWA systems and networks.

OWA helps in realizing global roaming facilities and seamless networking capabilities amongst different radio transmission technologies. It allows the network operators and subscribers to use third party solutions or user-defined solutions on their systems and to customize their systems according to their business models. Using OWA we can build systems which support multiple standards, multiple bands, multiple modes and offer diverse services to the customers.

OWA is different from SDR (software defined radio) as OWA basically maps various wireless standards into open interface parameters and maintain the system platform including RF, baseband, networks and applications an open architecture. Hence, in OWA systems, different modules (both hardware and software) can be from different vendors. It is similar to the open computer architecture in personal computer system and open network architecture in packet router system.

However, SDR is primarily a radio in which the preset operating parameters including inter alia frequency range, modulation type, and/or output power limitations can be reset or altered by software in order to support different radio frequency bands and/or standards. Though SDR has been improved a lot to support re-configurability and flexibility, it is a closed architecture in coupling different radios into one broadband transceiver. In other words, SDR consumes much more power and spectrum in exchange of the system flexibility. From the business point of view, SDR is not a cost-effective solution in wireless communications.

Furthermore, SDR uses broadband transceiver to support multiple wireless standards which is very expensive in the commercial environment. However, OWA converges multiple air interfaces in an open system platform to maximize the transmission bandwidth and system performance, but each wireless transmission still uses the narrowband transceiver, therefore maintaining the system in a cost-effective way which is very important for the commercial business.

By using OWA technology, we can converge multiple wireless standards in one open system to support both broadband high-speed radio transmission and seamless fast mobility capability in a mobile fast-fading propagation model environment while maintaining the very high mobile network capacity for the commercial mobile business.

In addition, OWA allows allocating multiple air interfaces into an external card so that the users can simply change wireless standards by updating such air interface card without having to change the mobile terminal device or terminal system.

Now, how to simplify the mobile terminal system?

Our mobile research results tell us when the transmission bandwidth is enough, the information processing consumes much more resources and energies than the transmission processing in the mobile terminal system. If we can reduce the processing burdens in the mobile terminal including baseband signal processing, application processing and networking processing, the overall system resources and power can be tremendously minimized and the system can be simplified.

The aforementioned OWA technology platform has secured enough transmission bandwidth by converging multiple wireless standards in one common platform so that the mobile terminal can be optimized for best-of-effort high-speed transmission.

By employing a computer server or network server with a home IP address as the Virtual Mobile Server, we can configure this server as the mobile cloud serve to handle the processing tasks for the mobile terminal system which becomes the mobile cloud client accordingly.

When the IP (Internet Protocol) connection is available for the mobile terminal based on OWA network access solution, the aforementioned mobile terminal moves its resource-consuming processing tasks to the remote virtual mobile server through IP connection, so that most of the processing tasks in the mobile terminal are done in the virtual mobile server instead.

Based on the above mobile cloud architecture, the mobile terminal system becomes very simple with basic functions of Transceiver, User Interface and Information Display only.

The OWA mobile cloud infrastructure of the present invention is a revolutionary approach in developing the next generation mobile wireless communications based on the OWA technology platform which basically discloses the following several major inventions for the future mobile terminal system:

1. OWA provides multiple wireless transmissions solution without relying on the broadband transceiver,
2. OWA provides broadband high-speed transmission while securing seamless mobility capability,
3. OWA provides cost-effective and spectrum-efficient mobile cloud solutions by introducing the Virtual Mobile Server and the independent Virtual Register and Call Switch (VR/CS) systems,
4. OWA shifts the traditional carrier-centric service architecture to the future user-centric service delivery infrastructure,
5. OWA simplifies the mobile terminal system by moving most of processing tasks remotely to the mobile cloud server,
6. OWA simplifies the mobile networking platform adaptively scheduled by the underlying OWA mobile cloud infrastructure.

With the aforementioned OWA mobile cloud platform, the optimized (maximize) wireless connections are guaranteed for the mobile relation networking services comprising the secured business networking, the secured personal networking and the unsecured general social networking.

Simplicity is the key driver for future mobile relation networking services which requires the mobile terminal device to be more efficient in both system simplicity and service simplicity.

SUMMARY OF THE INVENTION

The present invention is directed to a fully user-centric mobile relation management of business networking, personal networking and social networking for mobile terminal device with services adaptively and intelligently optimized by converged wireless connections based on open wireless architecture (OWA) mobile cloud infrastructure. By introducing QoW (Quality of Wireless connection) through OWA Operating System (OS), Mobile Relation Manager can ensure optimally secured business networking and personal networking for mobile users with mobile devices which are truly user-centric instead of carrier-centric.

In the present invention, the aforementioned business networking refers to secured business relation networking; the aforementioned personal networking refers to secured personal relation networking; and the aforementioned social networking refers to unsecured general social networking.

In the present invention, the networking refers to business relation networking, personal relation networking or general social networking.

The present invention is also directed to a simplified mobile terminal system based on OWA (open wireless architecture) mobile cloud architecture to support the convergence and integration of various wireless standards including existing and future mobile cellular standards, wireless local area network (WLAN) standards, wireless personal area network (WPAN) standards, broadband wireless access (BWA) standards and wireline standards. The mobile cloud architecture comprises the virtual mobile server as the mobile cloud server and the mobile terminal as the mobile cloud client.

The OWA mobile cloud infrastructure, as set forth above, tremendously reduces the processing tasks in the mobile terminal system by moving much processing tasks remotely to the virtual mobile server through IP connection based on OWA network access control.

An architecture of mobile cloud wireless mobile terminal of the present invention has the key functional units as follows:

Open Wireless Architecture (OWA) Interface—this software unit is utilized for the communication of various processing data and controls (including base-band signal processing, application processing and networking processing, but not limited to) between the mobile terminal and the virtual mobile server, as set forth above. Open architecture is very important for next generation communication systems because it allows different modules and subsystems to be provided by various different vendors through the open interface standards. OWA is different from SDR (software defined radio) as OWA basically maps various wireless standards into open interface parameters and maintain the system platform including RF, baseband, networks and applications an open architecture. Hence, in OWA systems, different modules (both hardware and software) can be from different vendors. It is similar to the open computer architecture in personal computer system and open network architecture in packet router system.

However, SDR is primarily a radio in which the preset operating parameters including inter alia frequency range, modulation type, and/or output power limitations can be reset or altered by software in order to support different radio frequency bands and/or standards. Though SDR has been improved a lot to support re-configurability and flexibility, it is a closed architecture in coupling different radios or modules into one broadband transceiver. In other words, SDR consumes much more power and spectrum in exchange of the system flexibility. From the business point of view, SDR is not a cost-effective solution in commercial wireless communications.

The OWA Interface of the present invention optimizes the transmission efficiency between the mobile terminal and the virtual mobile server, as set forth above.

The aforementioned OWA Interface is an open module to maximize the transmission efficiency between the aforementioned mobile terminal and the aforementioned virtual mobile server. The aforementioned OWA Interface can be minimized or reduced if any processing task (signal processing, application processing or networking processing including business, personal and social networking) is not requested or not in use, in order to further increase the transmission efficiency and reduce the transmission overhead.

OWA Software Defined Module (SDM)—this functional module supports multiple wireless standards (air-interfaces) for the mobile terminal of the present invention. The module can be stored in the aforementioned mobile terminal, or in the external card or downloaded from the Internet. The OWA of this invention supports open air interfaces so that users can change different wireless standards, including existing standards or future standards, by updating or replacing this SDM module, as set forth above, wherein this SDM module may further contain independent processors or DSP (Digital Signal Processing) components in addition to memory units to facilitate signal processing and/or protocol processing of related standards, etc.

OWA Core—this functional module provides basic multi-dimensional OWA open baseband processing of multiple wireless standards to ensure the fully operational and efficient capability of OWA digital transceiver working in an open wireless environment. It also schedules the signal processing tasks between the local processing unit and the remote processing unit in the virtual mobile server, as set forth above. Hence, the aforementioned OWA Core comprises OWA Mobile Cloud sub-system and OWA Virtualization sub-system to construct the OWA OS (operating system) to ensure optimal wireless connection based on Quality-of-Wireless (QoW).

OWA Application Processing Optimizer—this module schedules the basic applications (such as voice, short message, text, but not limited thereto) locally in the mobile terminal or the rich applications (such as video, big file, large data, web, multimedia, but not limited thereto) remotely through the aforementioned virtual mobile server.

Mobile Relation Manager to schedule and manage business networking, personal networking and social networking based on video, web and text transmission with the underlying OWA access layer, and both secured and unsecured networking API (application programming interface) with the application layer.

In the present invention, video, web and text transmissions refer to the wireless service transmissions by wireless over-the-air links. The aforementioned Video refers to very rich service and application consuming very large wireless bandwidth, the aforementioned web refers to medium or basic service and application consuming moderate wireless bandwidth, and the aforementioned text is the very basic service and application for wireless service.

The aforementioned networking services refer to various services from text messages (texts only) to web pages (including photos, images, texts, short files, short videos) to videos (non-short videos).

Radio Frequency (RF)/Intermediate Frequency (IF) Sub-system is a portable radio unit with open interface to the main functional units of the mobile terminal of the present invention. This separate open radio subsystem is necessary to support various wireless standards running in different frequency bands, wherein the user may change this radio part in case of needs. Additionally, this open radio subsystem supports new wireless transceiver technologies, for example, smart antennas, MIMO (Multiple Input, Multiple Output), High efficiency power amplifiers, Improved RF modules allowing multiple operating frequencies and improved receiver sensitivity, etc, but not intended to be limited to such technologies.

Network Interface Unit (NIU) is used to provide wireline network connection and wired communication interface for the mobile terminal of the present invention.

User Interface (INF) unit is used to provide user-machine interfaces including keyboard input, touch-screen input, information recognition input, wireless input, optical input and user information output, etc, but not limited thereto.

Display Unit is to generate the results of signal processing, application processing and networking processing, etc.

Sensor Unit is used to provide interfaces to different sensors of security, health, safety, location, automation and intelligence, etc, but not limited thereto.

Digital transceiver unit includes digital down-converter, digital up-converter, analog-to-digital converter and digital-to-analog converter.

It is well known to the ordinary skills in the art by the time of this invention that, the wireline communication is normally based on IP (internet protocol) connection, no matter that the physical wireline transmission is based on ATM (asynchronous transfer mode), Frame-Relay, Fiber Optical or other mediums. In such case, the wireline connection is based on "IP over such broadband high-speed wireline mediums". Because the wireline link is of very high-speed broadband transmission (up to hundreds of Gb/s to Tb/s), we assume the wireline transmission bandwidth is up to unlimited. Hence, we can simply call the wireline connection as IP connection.

However, for wireless transmission limited by the available radio spectrum, the wireless transmission bandwidth is far from "unlimited", and therefore it requires to specify the underlying physical transmission medium in order to support the IP connection. In general, wireless radio transmission is based on circuit-switched (instead of packet-switched) transmission mode, especially for the cellular mobile communications with fast-fading propagation model. Therefore, for general radio transmission technologies (RTTs) and by default, the wireless link is non-IP connection. For example, the cellular CDMA and TDMA mobile communications with fast-fading seamless mobile radio propagation model, the wireless transmission link is a non-IP connection. However, for some non-seamless mobile and short range wireless access networks, because the radio propagation model is slow-fading and the radio transmission environment is very stable, the packet-division (or packet switched) connection becomes possible over the slow-fading and stable circuit-switched transmission medium of the underlying physical layer. Such slow-fading and stable RTTs include the non-mobile WLAN, WPAN, BWA and the slow-mobile BWA and Cellular mobile networks. In order to support the mobile Internet services, by default, the WLAN, WPAN and BWA can support IP connection. For cellular mobile networks, IP connection is possible if the radio propagation model is slow-fading, mobile speed is low and/or the transmission environment is stable, otherwise, the cellular radio link remains the circuit-switched non-IP connection. So, for wireless communications by default, we have IP over WLAN, IP over WPAN, IP over BWA and IP over Cellular Mobile as well as non-IP Cellular Mobile, but not limited thereto.

The aforementioned mobile terminal is a converged open-architecture terminal supporting wireline network, WLAN, WPAN, BWA and cellular mobile network, as set for the above, but not limited thereto.

The invention of this OWA mobile cloud infrastructure includes the following main parts:

First, the OWA mobile cloud infrastructure of the present invention comprises the capability that the mobile terminal can access plurality of and many of wireless air interfaces (or called radio transmission technologies—RTTs) based on the OWA converged wireless network access architecture. Such RTTs include Wireless LAN (WLAN) technology, Wireless PAN (WPAN) technology, Wireless MAN technology (or called BWA technology) and Cellular Mobile network technology, but not limited thereto.

Based on WEI LU's discovery (known as LU's LAW) that "No single Radio Transmission Technology (RTT) can provide both Broadband High-speed Transmission and Seamless Mobility in a commercial environment", the future mobile wireless communications will be converging multiple RTTs in an open wireless architecture (OWA) platform. The future mobile terminal is therefore to integrate and converge multiple RTTs in the order of WLAN, WPAN, BWA and cellular mobile for the cost-effective and spectrum-efficient purpose.

On the horizontal dimension of same RTT, multiple wireless networks of same RTT may be available for the mobile terminal, and so, selection criteria are required to access such multiple wireless networks. For WLAN, WPAN and BWA, Best-of-Efforts (BoE) based on signal strength, network performance and transmission bandwidth are normally considered to select the right network and optimize the network access, but not limited thereto, because such wireless access is mostly complimentary or with low fee.

Traditionally the criterion to select cellular mobile networks (carriers) was based on rates, but it will have tremendous change in the future. The future mobile wireless communications will be converging multiple wireless technologies and converging multiple service delivery platforms in supporting truly service-oriented mobile communications rather than the traditional transmission-specific mobile networks. Therefore, the mobile users will care much more about the Best-of-Efforts (BoE), Simplicity of Use, Network Convergence, Inter-Networking QoS (quality of service) and Customer Service, etc instead of just rates. As many experts had expected that, in the future, the wireless access cost will be free or of low cost for most of mobile wireless networks, and the new business model will be shifting from the traditional carrier centric to the user-centric service delivery architecture. In such case, the traditional carrier rate will not make any sense for the future mobile users.

Another trend for future mobile users is to make the mobile terminal as simple as possible, mostly on low power consumption, simple system and transmission architecture, as well as convenient personal communication experience, etc. In order to construct such a simple system and transmission terminal, a new Mobile Cloud architecture has been disclosed to move the processing tasks (applications, signals and networks) from the mobile terminal to the mobile cloud server called Virtual Mobile Server whenever the IP connection is established and synchronized between the mobile terminal and the virtual mobile server. Such virtual mobile server can support plurality of and many of mobile terminals in a centralized server center, data center or any network center with IP connection, but not limited thereto.

Such user-centric mobile cloud architecture (instead of the traditional carrier-centric) introduces the aforementioned Virtual Mobile Server and the Virtual Register and Call Switch (VR/CS), wherein both of them synchronize each other through IP connection or any PDM (Packet Division Multiplexed) connection. The aforementioned VR/CS manages, selects and switches the optimal cellular mobile networks for the mobile terminal of the mobile user based on the selection criteria as set forth above. By introducing the aforementioned VR/CS, we do not need to change anything in the existing mobile or wireless network infrastructures, including any cellular mobile networks and other wireless networks.

The VR/CS and Virtual Mobile Server, as set forth above, synchronize each other through wireline IP or PDM connection, or these two systems can integrate into the same system or same center subject to different network infrastructure or different service environment. Further, both of them can support many mobile terminals and many mobile users wherein, many mobile users and many mobile terminals can share the same VR/CS and Virtual Mobile Server, as set forth above.

The aforementioned mobile terminal synchronizes with the aforementioned Virtual Mobile Server, further synchronizing with the aforementioned VR/CS whenever an IP connection is available for the aforementioned mobile terminal. Such IP connection includes IP over wireline network, IP over WLAN, IP over WPAN, IP over BWA and IP over Cellular mobile network, but not limited thereto.

The aforementioned VR/CS also manages the user-centric mobile user registrations comprising the mobile user identifier (ID) unifying and integrating mobile user personal communication identifier (ID), mobile user personal identifier (ID), mobile telephone number, mobile user domain address, mobile security identifier (or called Mobile DNA), or any identifier (ID) which the mobile user prefers, but not limited thereto. Based on the aforementioned and further below-mentioned mobile cloud infrastructure, the future wireless and wireline networks will be totally converged and integrated into an open architecture service delivery platform wherein ONE device, ONE number supporting multiple networks will become reality. Such user-centric communication registration (rather than the traditional carrier-centric closed telephone number registration) will enable truly user-preferable and truly service-oriented PERSONAL Communication architecture for the open convergence of multiple networks, both wireline and wireless networks. The aforementioned various mobile user registration identifiers are generally referred to the user-centric "Mobile User ID" by default in the present invention, but not limited thereto.

The aforementioned user-centric Mobile User ID managed in the aforementioned VR/CS is a very user-friendly communication ID, independent to the specific wireless or wireline networks, wherein, the specific transmission address in the specific networks may be mapped, encoded or calculated from the aforementioned Mobile User ID, but fully separated and independent from the mobile users. Therefore, the mobile users do not have to change the aforementioned Mobile User ID across various different networks including both wireline and wireless networks, in the future service-oriented network convergence infrastructure.

The aforementioned VR/CS can be implemented by general network equipment, such as gateway, switch, router, server, but no limited thereto, as long as IP or PDM connection is established. Such IP or PDM can be over any wireline mediums including ATM (asynchronous transfer mode), Frame Relay and Fiber Optical, but not limited thereto.

The aforementioned VR/CS manages the switching of various calls including voice, data, video and messages, but not limited thereto. For the aforementioned network selection to the multiple cellular mobile networks (carriers), the aforementioned VR/CS negotiates with such multiple cellular mobile networks based on the criteria as set forth above.

The aforementioned mobile terminal by Open Wireless Architecture (OWA) may connect to the networks (wireline networks or wireless networks) either through IP/PDM connection (IP over wireline network, IP over WLAN, IP over WPAN, IP over BWA or IP over Cellular mobile network) or through Non-IP cellular mobile network.

Second, the OWA mobile cloud infrastructure of the present invention incorporates an OWA mobile terminal integrating the WLAN technology, WPAN technology, Wireless MAN technology (or called BWA technology) and Wireline Internet Access technology with the common air interfaces mobile cellular communication standards (for example, cdma2000. WCDMA, GSM, GPRS, TD-SCDMA, OFDM, WiMax, etc, but not limited thereto) through the Open Wireless Architecture (OWA) platform of the present invention. OWA defines the open interface for each subsystem and function unit so that the system is open for upgrade and reconfiguration. The method of present invention supports any short range wireless access technologies including Wireless LAN, Wireless MAN and Wireless PAN, but not limited thereto. Also, as utilized hereinafter the term "common air interface mobile standards" refers to any type of mobile cellular technology operable in the fashion of "TDMA (time division multiplex access) or CDMA (code division multiplex access) or OFDM (orthogonal frequency division multiplex)", but not limited thereto.

It is well known to the ordinary skills in the art by the time of this invention that, the wireline communication is normally based on IP (internet protocol) connection, no matter that the physical wireline transmission is based on ATM (asynchronous transfer mode), Frame-Relay, Fiber Optical or other mediums. In such case, the wireline connection is based on "IP over such broadband high-speed wireline mediums". Because the wireline link is of very high-speed broadband transmission (up to hundreds of Gb/s to Tb/s), we assume the wireline transmission bandwidth is up to unlimited. Hence, we can simply call the wireline connection as IP connection.

However, for wireless transmission limited by the available radio spectrum, the wireless transmission bandwidth is far from "unlimited", and therefore it requires to specify the underlying physical transmission medium in order to support the IP connection. In general, wireless radio transmission is based on circuit-switched (instead of packet-switched) transmission mode, especially for the cellular mobile communications with fast-fading propagation model. Therefore, for general radio transmission technologies (RTTs) and by default, the wireless link is non-IP connection. For example, the cellular CDMA and TDMA mobile communications with fast-fading seamless mobile radio propagation model, the wireless transmission link is a non-IP connection. However, for some non-seamless mobile and short range wireless access networks, because the radio propagation model is slow-fading and the radio transmission environment is very stable, the packet-division (or packet switched) connection becomes possible over the slow-fading and stable circuit-switched transmission medium of the underlying physical layer. Such slow-fading and stable RTTs include the non-mobile WLAN, WPAN, BWA and the slow-mobile BWA and Cellular mobile networks. In order to support the mobile Internet services, by default, the WLAN, WPAN and BWA can support IP connection. For cellular mobile networks, IP connection is possible if the radio propagation model is slow-fading, mobile speed is low and/or the transmission environment is stable, otherwise, the cellular radio link remains the circuit-switched non-IP connection. So, for wireless communications by default, we have IP over WLAN, IP over WPAN, IP over BWA and IP over Cellular Mobile as well as non-IP over Cellular Mobile, but not limited thereto.

Third, the OWA mobile terminal of the present invention supports multiple standards of both wireless and wireline communications wherein Software Defined Module (SDM) is used to install or update the different communication standards module. This SDM can be stored in an External Card, for example, flash memory card, SIM (smart integrated memory) card, or downloadable from the Internet. The External Card of the SDM may also contain independent processor, DSP (Digital Signal Processor) or other components in addition to memory unit to facilitate additional system processing.

Fourth, the OWA mobile terminal of the present invention incorporates automatic network access capabilities, wherein the mobile terminal system searches the available network access in the order of wired network, Wireless LAN, Wireless PAN, BWA (broadband wireless access), mobile cellular network for example, but not limited thereto. The search order can be updated or managed by the user. When the wired network is detected, this mobile terminal becomes the wireline terminal and the communication is established by IP connection including IP data, IP video and VoIP for voice, etc. If wired network is not available, and Wireless LAN is detected, this mobile terminal becomes the Wireless LAN terminal and the communication is established by IP connection too. Wireless LAN access is regarded as the wireless extension of the wireline network access in the local short range domain. If both wired network and Wireless LAN are not available, the mobile terminal system of the present invention will search other short range wireless access networks including Wireless PAN, etc, or search broadband Wireless Metropolitan Area Networks (Wireless MAN) or called Broadband Wireless Access (BWA) for wireless IP connection. In the event that all these networks are not detected, the mobile terminal will switch back to the cellular mobile mode wherein cellular mobile air interface standards (for example, GSM/GPRS, cdma2000, WCDMA, TD-SCDMA, etc, but not limited to) will be employed based on the mobile preference list set by the user.

The cellular mobile networks include IP connection for slow-mobile, slow-fading and/or stable radio transmission environment, and non-IP traditional circuit-switched connection if the mobile speed is too fast or the propagation model is of fast-fading.

The mobile cellular air-interface modules supported in the mobile terminal of the present invention can be stored in the terminal itself, or in the External Card or its software and parameters downloaded from the Internet in the form of the aforementioned SDM. The mobile terminal associated with the OWA mobile cloud of the present invention is therefore capable of being operative in an open wireless and wireline communication environment supporting various standards and interfaces.

Fifth, the OWA mobile terminal of present invention incorporates a new incoming Call Processing Management capability in the Virtual Register and Call Switch (VR/CS), wherein the incoming mobile calls (including Voice, data, Video and Message calls) associated with the called mobile phone number or called mobile user identifier (mobile user ID) are queued for further connecting to the destination mobile terminal based on the Connection Table containing the current network access status of the destination mobile terminal as set forth above. If this destination mobile terminal connects to the wired Internet network (first priority for example) or Wireless LAN or Wireless PAN or Wireless MAN (or called BWA), the aforementioned incoming call is forwarded to the destination mobile terminal directly through IP connection by IP-calling from the VR/CS to the destination mobile terminal as set forth above, wherein the Visitor IP address reported by the destination mobile terminal is dialed. If the destination mobile terminal, as set forth above, does not connect to either the wired network or the wireless LAN or the wireless PAN or the wireless MAN, but connects to the cellular mobile network (for example, TDMA or CDMA or mobile OFDM), the aforementioned incoming call is forwarded to the associated Base Station wherein the communication with the destination mobile terminal is over the wireless cellular air link (through allocated mobile cellular transmission channel) of available mobile cellular standards. Based on the radio propagation model (fast-fading or slow-fading), terminal mobile speed (fast seamless mobile or slow mobile) and radio transmission environment (stable or unstable), the aforementioned cellular mobile communication link can be either IP connection or non-IP connection.

Based on different underlying physical transmission mediums, the IP connection of the aforementioned mobile terminal can be IP over wireline, IP over WLAN, IP over WPAN, IP over BWA or IP over Cellular Mobile, but not limited thereto.

In case the destination mobile terminal, as set forth above, is not able to access any above available networks, the VR/CS then forward the aforementioned incoming call to a main computer Server, in main server center or data center, which is configured as a Virtual Mobile Server called Mobile Cloud Server through IP connection, as will be described within the context of the present invention.

To simplify the system implementation and maximize the system performance of the aforementioned mobile terminal, in case the incoming call is a rich-application call (consuming much transmission bandwidth and processing resources) such as video call or large file call, etc, but the stable and high-speed IP connection is not available, the aforementioned mobile terminal may request the aforementioned VR/CS to reroute the aforementioned incoming call to the aforementioned virtual mobile server without connecting this incoming call to the aforementioned mobile terminal to save both wireless system and wireless transmission resources.

The aforementioned IP connection applied to all of the Packet Division Multiplex (PDM) networks in supporting packet-switched transmissions. By default in the present invention, PDM refers to IP or other packet-switched connections.

When multiple cellular networks are available for the aforementioned mobile terminal to select the optimal cellular mobile link(s), either in IP connection or in non-IP connection, the selection method of cellular networks is based on the overall rating of Best-of-Effort, Simplicity and Convergence, Inter-networking QoS (quality of service), Network Performance, Cost Effectiveness and Customer Services for each mobile user, but not limited thereto. Such network selection table is maintained in the Network Access Optimizer of the aforementioned VR/CS, synchronized with the virtual mobile server, as set forth above.

Whenever an IP connection is available, the aforementioned mobile terminal synchronizes with the virtual mobile server in a real-time and optimized manner.

The synchronized IP or PDM link between the mobile terminal and the virtual mobile server, as set forth above, include IP over WLAN, IP over WPAN, IP over BWA and IP over Cellular Mobile network, but not limited thereto.

The aforementioned WLAN may include WiFi network, wireless local loop, IEEE802.11 network and HyperLAN, but not limited thereto. The aforementioned WPAN may include Bluetooth network, ZigBee network, UWB (ultra wideband wireless) network and IEEE802.15 network, but not limited thereto. The aforementioned BWA may include WiMax network, spectrum-spreading wireless network, wireless ATM (asynchronous transfer mode) network and IEEE802.16 network, but not limited thereto. The aforementioned cellular mobile network may include CDMA, TDMA and OFDM, as set forth above, but not limited thereto.

Sixth, the OWA mobile cloud of the present invention comprises the utilization of the computer server(s) with Internet access as the Virtual Mobile Server (also called Mobile Cloud Server) in Data Center or in any server locations, as set forth above, supporting the aforementioned mobile terminal of the present invention with enhanced functions and services, for example, network optimization, mobile relations server, mobile applications, mobile Internet optimization server, mobile Internet applications server, Voice and Video server, Short Message Service (SMS) server, Multimedia Message Service (MMS) server, aforementioned SDM center and Date Center, etc. This Virtual Mobile Server, as set forth above, also takes the function of Special Service Management for the aforementioned mobile terminal on mobile location, emergency call, information collection, security and safety control, sensor network control and OWA mobile cloud O&M (Operation and Maintenance), etc. Additionally, one Virtual Mobile Server, as set forth above, can support one or multiple mobile terminals of the present invention, wherein many such mobile terminals can share the same aforementioned Virtual Mobile Server.

The aforementioned Virtual Mobile Server(s) supporting group or many of aforementioned mobile terminals can locate in the computer servers' center or in the network data center.

For the OWA mobile cloud infrastructure of the present invention, the aforementioned virtual mobile server comprises an important Terminal Processing Unit which operates the OWA Interface processing, base-band signal processing, application processing and networking processing for the mobile terminal, as set forth above.

The aforementioned Terminal Processing Unit further comprises the following functions with the aforementioned mobile terminal: bandwidth optimization and synchronization, signals synchronization, applications synchronization as well as network optimization and synchronization.

The aforementioned virtual mobile server also includes a Mobile Internet Applications server for the aforementioned mobile terminal when the IP connection between them is available.

The aforementioned virtual mobile server is a very important system for the OWA mobile cloud infrastructure which is utilized for mobile cloud server processing for the mobile terminal(s), hosting various mobile applications and maintaining the aforementioned SDM air interfaces modules for one or multiple mobile terminals, as set forth above.

The aforementioned virtual mobile server can be located in the network Data center supporting groups of the aforementioned mobile terminals.

Whenever an IP connection is available, the aforementioned mobile terminal synchronizes with the virtual mobile server in a real-time and optimized manner.

The synchronized IP or PDM link between the mobile terminal and the virtual mobile server, as set forth above, include IP over WLAN, IP over WPAN, IP over BWA and IP over Cellular Mobile network, but not limited thereto.

Seventh, the OWA mobile cloud infrastructure of the present invention defines a new OWA Interface to maximize the information transmission efficiency between the aforementioned mobile terminal and the aforementioned virtual mobile server. This OWA interface optimizes the wireless transmission for IP (internet protocol) over multiple radio transmission technologies (RTTs) including IP over WLAN, IP over WPAN, IP over BWA or IP over Cellular Mobile, but not limited thereto.

Eighth, the OWA mobile terminal of the present invention supports open interface between the main functional units of the mobile terminal and the RF/IF (radio frequency/intermediate frequency) subsystem so that the mobile terminal RF/IF part is portable and reconfigurable. In other words, mobile users can change or replace the RF/IF ports subject to multiple different RTTs but without having to change the aforementioned mobile terminal device. This method of the present invention is necessary when the different wireless standards run in different frequency bands which are not within same RF/IF transceiver limit. This open and portable RF/IF architecture of the present invention is also very important to support new wireless transceiver technologies including smart antennas, MIMO (Multiple Input, Multiple Output), High efficiency power amplifiers, Improved RF modules allowing multiple operating frequencies and improved receiver sensitivity, etc.

Ninth, the system and method of present invention introduces a new innovative solution to converge and integrate the various communication devices into one open platform, wherein the conventional home phone, office phone and cellular phone, etc are combined together into an integrated and converged terminal, as set forth above, with one single communication number. Furthermore, the aforementioned common terminal of the present invention utilizes the existing or any future communication standards (including both wireless and wireline standards by changing or replacing the aforementioned SDM card) rather than relying on new defined transmission technologies. Specifically, as described within the context of the present invention, the aforementioned common terminal is just an improvement of the existing communication device, wherein this common terminal, as set forth above, is operable in each individual communication standard and backwards compatible to the same individual transmission technology.

Lastly, the system and method of present invention comprises the best and optimal utilization of the existing communication infrastructure, wherein almost all existing telecommunication equipments, including Mobile Switching Center, Base Station, Gateway and Router, and backbone networks, but not limited thereto, remain unchanged and fully operable.

The advantage of the OWA Mobile Cloud system and method of the present invention includes remarkable improvement of spectrum efficiency in mobile cellular bands, improvement in network resource and radio transmission resource, optimization in network interoperability, enhancement of the emerging broadband availability, convergence of entertainment and Voice/Data services, interaction and integration of various communication devices and defining the future intelligence of truly smart and service-oriented communication environment. More specifically, the system of the present invention provides the capability of the true Personal Communications, wherein one single mobile terminal with one single mobile number or mobile identifier manages all personal communications needs everywhere and anytime.

The invention of the classified relation networking optimization platform in OWA mobile cloud terminal includes the following main parts:

After the underlying wireless connection is optimized based on QoW (Quality of Wireless connection), and the access to the mobile cloud server is secured, the mobile terminal can classify the networking needs into business networking, personal networking and social networking supporting different services including video, web and text/message. A classified relation networking optimization platform by OWA mobile cloud comprises OWA OS (operating system) module supporting optimized wireless connection based on QoW (Quality of Wireless connection) and Networking Service OS module supporting best-connected and secured business networking and personal networking, as well as best-connected and un-secured social networking.

The OWA OS module includes OWA Mobile Cloud Client synchronizing with virtual mobile server (as mobile cloud server) and OWA Virtualization Sub-Layer supporting various multiple radio transmission technologies (RTTs) including WLAN, WPAN, BWA and cellular mobile, etc. The Mobile Cloud Client optimizes the mobile terminal device in both wireless transmission and system processing, and provides the best wireless connections (cost, bandwidth and spectrum efficiency) based on QoW (Quality of Wireless connections). The Mobile Cloud client also allocates the processing tasks in the mobile terminal to the virtual mobile server as much as possible by the OWA optimized wireless connections for the mobile terminal.

The Networking Service OS module comprises Mobile Relation Manager scheduling best and optimal services (rich video, rich web and simple text/message) for business networking, personal networking or social networking adaptively controlled by the OWA OS module, and Mobile DNA (DeoxyriboNucleic Acid, simply referring to unique identifier in the present invention) unit encoding/decoding security DNA for business networking and personal networking in an enhanced security measure.

When a high-speed IP connection with required good QoW is available between mobile terminal and virtual mobile server, all of the services including video, web and message will be activated for the business networking, personal networking and social networking. When only non-IP cellular mobile connection is available or slow IP connection is available with poor QoW, the Mobile Relation Manager will limit business networking, personal networking and social networking to the basic services including basic web and text/message only.

The Networking Service OS module provides a truly user-centric relation classification layer (or classification service layer), fully independent to the underlying specific wireless transmissions. In addition, the OWA OS module provides an open access layer totally separating specific wireless RTTs with higher layers including classification service layer and Networking Service OS module, etc.

Above the Classification service layer of the Networking Service OS module is an open Application layer with common networking API (application programming interface) for secured personal and business networking as well as unsecured social networking. The open Application layer can be synchronized to an office or home desktop computer or to a virtual mobile server, as set forth above.

The relation management in Mobile Relation Manager comprises the following control procedures:

Step 1: Check if "IP over Wireless" is available or not. If it is available, it goes to the next step (Step 2), otherwise it enables and limits the mobile terminal to basic services of basic web and message/text only for mobile terminal, and then moves to Step 3. The IP over Wireless includes IP over WLAN, IP over WPAN, IP over BWA and IP over Cellular, but not limited thereto. When the IP/Wireless (IP over Wireless) is available, the mobile terminal is synchronized with the mobile cloud server (virtual mobile server).

Step 2: Check if QoW (Quality of Wireless connection) is acceptable or not. If it is acceptable, it enables full services of rich video, rich web and message/text for the mobile terminal, and then moves to Step 3. otherwise it enables moderate services of web and message/text only for the mobile terminal, and then moves to Step 3. The QoW check is basically on the combined consideration of cost, bandwidth and spectrum efficiency, wherein a good QoW means a good transmission bandwidth with good cost-effectiveness and spectrum-efficiency, for example, good QoW with IP over WLAN, but not limited thereto. In contrast, a poor QoW means a poor transmission bandwidth, or poor cost-effectiveness though transmission bandwidth could be good, or poor spectrum efficiency, for example, a poor QoW may mean IP over Cellular mobile but costing too much for the mobile services. IP over Cellular includes IP over TDMA, IP over CDMA, IP over OFDM, but not limited thereto.

Step 3: Check if Secured Personal Networking and/or Business Networking are requested or not. If it is or they are requested, then check if QoS (quality of service) is acceptable or not, otherwise it goes directly to the unsecured Application layer of general social networking. If QoS is acceptable, it moves to Mobile DNA processing unit, then continues to the secured Application layer of business networking and/or personal networking, otherwise it automatically shuts down the secured networking service including business networking and personal networking because the service quality is too poor to ensure the security performance, then goes directly to the unsecured Application layer of general social networking. The QoS check is based on standard service quality performance including bandwidth, latency or delay, jitter or variation in delay, synchronization, packet loss ratio, packet error ratio, but not limited thereto.

The QoW and QoS controls fully ensure the user-centric relation management of secured business networking and personal networking for the mobile users based on OWA mobile cloud infrastructure.

The implementation details of Mobile DNA unit in mobile terminal device comprise:

a) Uplink security—from Mobile Device to Mobile Cloud Server (Virtual Mobile Server)

First, Personal and Business DNA Encoder, to encode user information, device information and content information into a DNA code or sequence. The DNA Encoder can be processed through multidimensional matrix operation by user information including user ID (identifier), user name, user SSN (social security number), user FP (fingerprint), user PIN (personal identification number), device information including device ID, device GID (global identification), device SIM (Subscriber Identity Module), device SN (serial number) with content information including content title, content author, content ISSN (International Standard Serial Number), content ISBN (International Standard Book Number), but not limited thereto, or through matrix operation of user parameters, network parameters, transmission parameters, device parameters with content information, but not limited thereto.

Second, Module of Fingerprinting DNA into Contents, to fingerprint the DNA into user contents (video, web and message/text) and generate the integrated information stream or data. The fingerprinting can be content-based fingerprinting with encoded DNA, watermark fingerprinting with the DNA, security coded fingerprinting with the DNA or user-defined fingerprinting with the DNA, but not limited thereto.

Third, Security Encryption module, to encrypt the fingerprinted contents to generate secured information output.

The security encryption can use standard or common encryption method or user-defined encryption algorithm.

The DNA Encoder, DNA Fingerprinting module and Security Encryption module construct the secured information frame to be transmitted securely from mobile device to mobile cloud server. The mobile cloud server connects directly to the wireline networks and can forward, distribute, reroute, dispatch or switch the secured information frame by the Mobile DNA to other mobile device(s) either inside the same network or outside the same network or to any other networks through wireline backbone network or through global Internet to construct end-to-end secured networking including secured business networking and secured personal networking, as set forth above, among different mobile terminals, through the aforementioned secured information frame by the aforementioned Mobile DNA, synchronized with the aforementioned virtual mobile server.

In this way by the present invention, the entire networking infrastructure of business networking and personal networking is fully secured and protected.

b) Downlink security—from Mobile Cloud Server (Virtual Mobile Server) to Mobile Device First, Security Decryption module, to decrypt the received secured information input to restore the fingerprinted contents.

The security decryption can use standard or common decryption method or user-defined decryption algorithm.

Second, Module of Tracking and Detecting DNA from received Contents, module of Personal and Business DNA Decoder and DNA Match and Authorization module, to detect and decode the correct DNA from the received fingerprinted contents. The module of Tracking and Detecting DNA is utilized to filter out the correct DNA from the received contents. The DNA Match and Authorization module is utilized to check whether it is an authorized DNA or a fake DNA based on authorization algorithm by searching DNA database in the mobile terminal device synchronized with the virtual mobile server. The Personal and Business DNA Decoder is utilized to decode DNA into User Information, Device Information and Content Information.

Third, Content Claim module, to claim and generate the original contents from the received fingerprinted contents by detected and authorized DNA. The original contents include original video, original web and original message/text.

The DNA Decoder and Contents Claim can be inverse or reverse operations of the DNA Encoder and Fingerprinting DNA into Contents. The DNA Tracking and Detecting can be content-based DNA detection, but not limited thereto.

The DNA algorithm is a mathematical function of user information, device information and content information, but can be simplified, reduced, shortened or compressed in different applications, for example, the content information can be omitted in simple applications, but not limited thereto.

The Mobile DNA unit can be simplified, reduced, compressed or reconfigured subject to the adaptive control of the underlying OWA OS module to optimize the whole system performance in wireless connections based on the QoW and in wireless services based on the QoS.

The DNA Match and Authorization module facilitates effective blocking of unnecessary contents including virus, spam, spyware, advertisement from coming to the mobile terminal by matching the detected DNA code with the DNA database to protect security and optimize performance for business networking and personal networking, as set forth above.

As a conclusion, the OWA mobile cloud terminal with classified relation networking optimization platform of the present invention is a revolutionary approach in developing the next generation mobile wireless communications based on the OWA technology platform which basically discloses the following several major inventions for the future mobile terminal system:
1. OWA provides multiple wireless transmissions solution without relying on the expensive broadband transceiver,
2. OWA provides broadband high-speed transmission while securing seamless mobility capability,
3. OWA provides cost-effective and spectrum-efficient mobile cloud solutions by introducing the Virtual Mobile Server platform,
4. OWA enables the mobile terminals and the virtual mobile server fully synchronized when the IP connection is available, thus greatly simplifying the mobile terminal system in terms of power consumption and system performance,
5. OWA discloses the converged and Best-of-Effort IP connection for the mobile terminal comprising IP over wireline network, IP over WLAN, IP over WPAN, IP over BWA and IP over Cellular Mobile networks,
6. OWA OS (operating system) provides optimized and adaptive wireless connection for the mobile terminal to enable best services for mobile users in classified personal, business and social networking,
7. OWA OS manages multiple wireless transmission technologies in an intelligent and adaptive way based on the disclosed QoW (Quality of Wireless connection) measures,
8. OWA facilitates secured business networking and personal networking for mobile terminal device, autonomously controlled by the underlying OWA OS platform,
9. OWA schedules services (video, web and message) adaptively for mobile users on business networking, personal networking and social networking, autonomously controlled by the underlying OWA OS platform.

Further in conclusion, an Open Wireless Architecture (OWA) mobile cloud terminal with classified relation networking optimization platform of the present invention discloses the following systems:
a) Virtual Register and Call Switch (VR/CS) managing, selecting, connecting and switching the multiple cellular mobile networks for a Mobile Terminal of a mobile user based on preset network selection criteria, and also managing mobile users' registrations based on user-centric instead of carrier-centric registration model,
b) Virtual Mobile Server (VMS) as Mobile Cloud Server managing mobile users, mobile users' network access, mobile applications and mobile data center, and synchronizing with the aforementioned VR/CS through wireline IP (Internet Protocol) or PDM (Packet Division Multiplexed) connection,
c) Mobile Terminal as Mobile Cloud Client connecting to and synchronizing with the aforementioned VMS and VR/CS through the aforementioned IP over wireline or wireless connection, or connecting to the aforementioned VR/CS through Non-IP (internet protocol) cellular mobile connection, and
d) Mobile Relation Manager adaptively controlling the aforementioned business networking, personal networking and social networking in both mobile services and mobile connections based on the aforementioned OWA OS platform.

Simplicity is the key driver for future mobile relation networking services which requires the mobile terminal device to be more efficient in both system simplicity and service simplicity. The aforementioned OWA OS simplifies the mobile terminal by moving much processing tasks to the virtual mobile server and optimizing wireless connections through the virtual mobile server, and the aforementioned Networking Service OS simplifies the relation networking platform for mobile terminal by adaptively classifying secured business networking, secured personal networking and unsecured social networking between the mobile terminal and the virtual mobile server, wherein the virtual mobile server maintains the complete and full relation networking services, but the mobile terminal is scheduled for the optimal relation networking service automatically controlled by the OWA OS and synchronized with the virtual mobile server.

The present invention of classified relation networking optimization benefits from the revolutionary Open Wireless Architecture (OWA) Mobile Cloud platform which greatly optimizes the networking performance of business networking, personal networking and social networking.

Scaling in wireless communications is in number of connected devices or systems, no longer in number of transistors or chips. Trillions of radios will bring virtualization to a new level of open wireless architecture (OWA).

The future mobile networks will evolve to an User-centric Mobile Cloud infrastructure based on Open Wireless Architecture (OWA) rather than the traditional Carrier-centric mobile cellular infrastructure based on specific radio transmission technology.

Open Wireless Architecture (OWA) converges WLAN, WPAN, BWA and Cellular mobile into one open platform to optimize the wireless transmission and wireless access for the future User-Centric Mobile Device and to balance effectively the overall performance among wireless Broadband Highspeed Transmission, Seamless Mobility and Network Capacity.

All these and other introductions of the present invention will become much clear when the drawings as well as the detailed descriptions are taken into consideration.

BRIEF DESCRIPTION OF THE DRAWINGS

For the full understanding of the nature of the present invention, reference should be made to the following detailed descriptions with the accompanying drawings in which:

FIG. 1 is a classified relation networking optimization platform supporting business networking, personal networking and social networking by Open Wireless Architecture (OWA) mobile cloud infrastructure, wherein a Mobile Relation Manager intelligently and adaptively administrates the mobile users' networking services (Video, Web or text/message) in a secured or un-secured manner based on the highly optimized wireless connections (by OWA OS layer with required Quality-of-Wireless) through underlying OWA mobile cloud solution.

FIG. 2 discloses the control procedure in the Mobile Relation Manager, as set forth above, to schedule video, web and/or text effectively for business networking, personal networking or social networking, either in a secured or un-secured manner, based on QoW (quality of wireless connection) and QoS (quality of service).

FIG. 3 is a detailed introduction of mobile DNA unit for the secured business networking and personal networking with the Mobile Relation Manager, as set forth above. The Mobile DNA provides a secured connection between mobile device and mobile cloud server and beyond.

FIG. 4 is a Mobile Cloud infrastructure supporting OWA mobile terminal wherein Virtual Mobile Server and Virtual Register and Call Switch (VR/CS) are disclosed to optimize the system and transmission performance for the mobile terminal.

FIG. 5 is a Call Processing Management in Virtual Register and Call Switch (VR/CS) Center with Virtual Mobile Server, wherein the incoming mobile calls (Voice, Data, Video or Message) are further forwarded to the aforementioned mobile terminal through IP link or over the non-IP mobile cellular air link channel. For the outgoing calls, the mobile user can simply dial the destination IP address if there is an IP connection for the mobile terminal, or select the preferred cellular network if no IP connection is available for the mobile terminal.

FIG. 6 introduces a Virtual Mobile Server (VMS) as the mobile cloud server, wherein the mobile terminal processing tasks are executed in this server over the cloud which include the OWA interface processing, signal processing, application processing and networking processing. It also processes other functions for the mobile terminal(s) of the present invention. The VMS is located in the main server center or in the Data center, supporting groups of mobile terminals or mobile users.

FIG. 7 discloses an OWA application optimizer in the mobile terminal to manage the mobile application processing either through the virtual mobile server or locally in the mobile terminal.

Like reference numerals refer to like parts throughout the several views of the drawings.

DESCRIPTION OF THE PREFERRED EMBODIMENT

The present invention relates to a fully user-centric mobile relation management of business networking, personal networking and social networking for mobile terminal device with services adaptively and intelligently optimized by converged wireless connections based on open wireless architecture (OWA) mobile cloud infrastructure. By introducing QoW (Quality of Wireless connection) through OWA Operating System (OS), Mobile Relation Manager can ensure optimally secured business networking and personal networking for mobile users with mobile devices which are truly user-centric instead of carrier-centric.

The present invention also relates to a mobile cloud architecture based on OWA platform wherein the processing tasks of the mobile terminal including base-band signal processing, application processing and networking processing can be allocated to the virtual mobile server which is a computer server with home IP address or assigned roaming IP address by the aforementioned home IP address when an IP connection is set up between the mobile terminal and the virtual mobile server. Such IP connection is established when the mobile terminal connects to a wireline network, a short range wireless access network (for example, Wireless LAN and Wireless PAN, but not limited thereto) or a broadband wireless metropolitan area network (Wireless MAN, for example, Broadband Wireless Access system, but not limited thereto). In this way, the mobile terminal's system complexity can be tremendously reduced, the processing power consumption can be greatly decreased and the system performance is maximized accordingly.

An OWA mobile cloud infrastructure of the present invention comprises the capability that the mobile terminal can access plurality of and many of wireless air interfaces (or called radio transmission technologies—RTTs) based on the OWA converged wireless network access architecture. Such RTTs include Wireless LAN (WLAN) technology, Wireless PAN (WPAN) technology, Wireless MAN technology (or called BWA technology) and Cellular Mobile network technology, but not limited thereto.

Based on WEI LU's discovery that "No single Radio Transmission Technology (RTT) can provide both Broadband High-speed Transmission and Seamless Mobility in a commercial environment", the future mobile wireless communications will be converging multiple RTTs in an open wireless architecture (OWA) platform. The future mobile terminal is therefore to integrate and converge multiple RTTs in the order of WLAN, WPAN, BWA and cellular mobile for the cost-effective and spectrum-efficient purpose.

On the horizontal dimension of same RTT, multiple wireless networks of same RTT may be available for the mobile terminal, and so, selection criteria are required to access such multiple wireless networks. For WLAN, WPAN and BWA, Best-of-Efforts (BoE) based on signal strength, network performance and transmission bandwidth are normally considered to select the right network and optimize the network access, but not limited thereto, because such wireless access is mostly complimentary or with low fee.

Traditionally the criteria to select cellular mobile networks (carriers) was based on rates, but it will have tremendous change in the future. The future mobile wireless communications will be converging multiple wireless technologies and converging multiple service delivery platforms in supporting truly service-oriented mobile communications rather than the traditional transmission-specific mobile networks. Therefore, the mobile users will care much more about the Best-of-Efforts (BoE), Simplicity of Use, Network Convergence, Inter-Networking QoS (quality of service) and Customer Service, etc instead of just rates. As many experts had expected that, in the future, the wireless access cost will be free or of low cost for most of mobile wireless networks, and the new business model will be shifting from the traditional carrier centric to the user-centric service delivery architecture. In such case, the traditional carrier rate will not make any sense for the future mobile users.

Another trend for future mobile users is to make the mobile terminal as simple as possible, mostly on low power consumption, simple system and transmission architecture, as well as convenient personal communication experience, etc. In order to construct such a simple system and transmission terminal, a new Mobile Cloud architecture has been disclosed to move the processing tasks (applications, signals and networks) from the mobile terminal to the mobile cloud server called Virtual Mobile Server whenever the IP connection is established and synchronized between the mobile terminal and the virtual mobile server. Such virtual mobile server can support plurality of and many of mobile terminals in a centralized server center, data center or any network center with IP connection, but not limited thereto.

After the underlying wireless connection is optimized, and the access to the mobile cloud server is secured, the mobile terminal can classify the networking service needs into business networking, personal networking and general social networking supporting different services including video, web and text/message. FIG. 1 shows a classified relation networking optimization platform by OWA mobile cloud which comprises OWA OS (operating system) module supporting optimized wireless connection based on QoW (Quality of Wireless connection) and Networking Service OS module supporting best-connected and secured business networking and personal networking, as well as best-connected and unsecured social networking.

The aforementioned OWA OS module includes OWA Mobile Cloud Client synchronizing with virtual mobile server (as mobile cloud server) and OWA Virtualization Sub-Layer supporting various multiple radio transmission technologies (RTTs) including WLAN, WPAN, BWA and cellular mobile, as set forth above. The aforementioned Mobile Cloud Client optimizes the mobile terminal device in both wireless transmission and system processing, and provides the best wireless connections (cost, bandwidth and spectrum efficiency) based on QoW (Quality of Wireless connections). The aforementioned Mobile Cloud client also allocates the processing tasks in the aforementioned mobile terminal to the aforementioned virtual mobile server as much as possible by the OWA optimized wireless connections for the aforementioned mobile terminal.

The aforementioned Networking Service OS module comprises Mobile Relation Manager scheduling best and optimal services (rich video, rich web and simple text/message) for business networking, personal networking or social networking adaptively controlled by the aforementioned OWA OS module, and Mobile DNA unit encoding/decoding security DNA for the aforementioned business networking and personal networking.

When a high-speed IP connection with required good QoW is available between mobile terminal and virtual mobile server, as set forth above, all of the services including the aforementioned video, web and message will be activated for the aforementioned business networking, personal networking and social networking. When only non-IP cellular mobile connection is available or slow IP connection is available with poor QoW, the aforementioned Mobile Relation Manager will limit the aforementioned business networking, personal networking and social networking to the basic services including basic web and text/message only.

The aforementioned Networking Service OS module provides a truly user-centric relation classification service layer, fully independent to the underlying specific wireless transmissions. In addition, the aforementioned OWA OS module provides an open access layer totally separating specific wireless RTTs with higher layers including classification service layer and Networking Service OS module, as set forth above.

The aforementioned QoW is automatically updated and/or optimized by the optimized wireless connections of mobile terminal in the preset automatic connection optimization order, from highest to lowest, of WLAN, WPAN, BWA and cellular mobile, as set forth above, but the automatic connection optimization order can be reset or changed by mobile user, and the updated QoW adaptively synchronizes with the Mobile Relation Manager and the Mobile DNA unit in the Networking Service OS module to optimize networking and service performance of business networking, personal networking and social networking, as set forth above.

Above the aforementioned Classification service layer of the Networking Service OS module is an open Application layer with common networking API (application programming interface) for secured personal and business networking as well as un-secured social networking. The aforementioned open Application layer can be synchronized to an office/home desktop computer or to a virtual mobile server, as set forth above.

FIG. 2 discloses the implemental flowchart of the aforementioned Mobile Relation Manager. The relation management comprises the following control protocols:

Step 1: Check if "IP over Wireless" is available or not. If it is available, it goes to the next step (Step 2), otherwise it enables and limits to basic services of basic web and message/text only for mobile terminal, and then moves to Step 3. The aforementioned IP over Wireless includes IP over WLAN, IP over WPAN, IP over BWA and IP over Cellular, as set forth above, but not limited thereto. When the aforementioned IP/Wireless (IP over Wireless) is available, the mobile terminal is synchronized with the mobile cloud server (virtual mobile server), as set forth above.

Step 2: Check if QoW (Quality of Wireless connection) is acceptable or not. If it is acceptable, it enables full services of rich video, rich web and message/text for the mobile terminal, and then moves to Step 3. otherwise it enables moderate services of web and message/text only for the mobile terminal, and then moves to Step 3. The aforementioned QoW check is basically on the combined consideration of cost, bandwidth and spectrum efficiency, wherein a good QoW means a good transmission bandwidth with good cost-effectiveness and spectrum-efficiency, for example, good QoW with the aforementioned IP over WLAN, but not limited thereto. In contrast, a poor QoW means a poor transmission bandwidth, or poor cost-effectiveness though transmission bandwidth could be good, or poor spectrum efficiency, for example, a poor QoW may mean IP over Cellular mobile but costing too much for the mobile services. The aforementioned IP over Cellular includes IP over TDMA, IP over CDMA, IP over OFDM, but not limited thereto.

Step 3: Check if Secured Personal Networking and/or Business Networking are requested or not. If it is or they are requested, then check if QoS (quality of service) is acceptable or not, otherwise it goes directly to the unsecured Application layer of general social networking. If the aforementioned QoS is acceptable, it moves to Mobile DNA processing unit, then continues to the secured Application layer of business networking and/or personal networking, otherwise it automatically shuts down the secured networking service including business networking and personal networking because the service quality is too poor to ensure the security performance, then goes directly to the unsecured Application layer of general social networking. The aforementioned QoS check is based on standard service quality performance including bandwidth, latency or delay, jitter or variation in delay, synchronization, packet loss ratio, packet error ratio, but not limited thereto.

The aforementioned QoW and QoS controls fully ensure the user-centric relation management of secured business networking and personal networking for the mobile users based on OWA mobile cloud infrastructure.

FIG. 3 discloses the implementation details of Mobile DNA unit in mobile terminal device which comprises:

Uplink security—from Mobile Device to Mobile Cloud Server (Virtual Mobile Server)

First, Personal and Business DNA Encoder, to encode user information, device information and content information into a DNA code or sequence. The aforementioned DNA Encoder can be through multidimensional matrix operation by user information including user ID (identifier), user name, user SSN (social security number), user FP (fingerprint), user PIN (personal identification number), device information including device ID, device GID (global identification), device SIM (Subscriber Identity Module), device SN (serial number) with content information including content title, content author, content ISSN (International Standard Serial Number), content ISBN (International Standard Book Number), but not limited thereto, or through matrix operation of user parameters, network parameters, transmission parameters, device parameters with content information, but not limited thereto.

Second, Module of Fingerprinting DNA into Contents, to fingerprint the aforementioned DNA into user contents (video, web and message/text) and generate the integrated information stream or data. The aforementioned fingerprinting can be content-based fingerprinting with encoded DNA, watermark fingerprinting with the aforementioned DNA, security coded fingerprinting with the aforementioned DNA or user-defined fingerprinting with the aforementioned DNA, but not limited thereto.

Third, Security Encryption module, to encrypt the fingerprinted contents to generate secured information output.

The aforementioned security encryption can use standard or common encryption method or user-defined encryption algorithm.

The aforementioned DNA Encoder, DNA Fingerprinting module and Security Encryption module construct the secured information frame to be transmitted securely from mobile device to mobile cloud server, as set forth above. The aforementioned mobile cloud server connects directly to the wireline networks and can forward, distribute, reroute, dispatch or switch the aforementioned secured information frame by the aforementioned Mobile DNA to other mobile device(s) either inside the same network or outside the same network or to any other networks through wireline backbone network or through Internet.

Downlink security—from Mobile Cloud Server (Virtual Mobile Server) to Mobile Device First, Security Decryption module, to decrypt the received secured information input to restore the fingerprinted contents, as set forth above.

The aforementioned security decryption can use standard or common decryption method or user-defined decryption algorithm.

Second, Module of Tracking and Detecting DNA from received Contents, module of Personal and Business DNA Decoder and DNA Match and Authorization module, to detect and decode the correct DNA from the received fingerprinted contents. The aforementioned module of Tracking and Detecting DNA is utilized to filter out the correct DNA from the received contents. The aforementioned DNA Match and Authorization module is utilized to check whether it is an authorized DNA or a fake DNA based on authorization algorithm by User Information and/or Device information, as set forth above. The aforementioned Personal and Business DNA Decoder is utilized to decode DNA into User Information, Device Information and Content Information, as set forth above.

Third, Content Claim module, to claim and generate the original contents from the received fingerprinted contents by detected and authorized DNA. The aforementioned original contents include original video, original web and original message/text.

The aforementioned DNA Decoder and Contents Claim can be inverse or reverse operations of the aforementioned DNA Encoder and Fingerprinting DNA into Contents. The aforementioned DNA Tracking and Detecting can be content-based DNA detection, but not limited thereto.

The aforementioned DNA is a mathematic function of user information, device information and content information, but can be simplified, reduced, shortened or compressed in different applications, for example, the content information can be omitted in simple applications, but not limited thereto.

The aforementioned Mobile DNA unit can be simplified, reduced, compressed or reconfigured subject to the adaptive control of the underlying OWA OS module, as set forth above, to optimize the whole system performance in wireless connections based on the aforementioned QoW and in wireless services based on the aforementioned QoS.

Such user-centric mobile cloud architecture (instead of the traditional carrier-centric) for the OWA mobile terminal as shown in FIG. 4, introduces the aforementioned Virtual Mobile Server and a Virtual Register and Call Switch (VR/CS), wherein both of them synchronize each other through IP connection or any PDM (Packet Division Multiplexed) connection. The aforementioned VR/CS manages, selects and switches the optimal cellular mobile networks for the mobile terminal of the mobile user based on the selection criteria as set forth above. By introducing the aforementioned VR/CS, we do not need to change anything in the existing mobile or wireless network infrastructures, including any cellular mobile networks and other wireless networks.

The VR/CS and Virtual Mobile Server, as set forth above, synchronize each other through wireline IP or PDM connection, or these two systems can integrate into the same system or same center subject to different network infrastructure or different service environment. Further, both of them can support many mobile terminals and many mobile users wherein, many mobile users and many mobile terminals can share the same VR/CS and Virtual Mobile Server, as set forth above.

The aforementioned mobile terminal synchronizes with the aforementioned Virtual Mobile Server, further synchronizing with the aforementioned VR/CS whenever an IP connection is available for the aforementioned mobile terminal. Such IP connection includes IP over wireline network, IP over WLAN, IP over WPAN, IP over BWA and IP over Cellular mobile network, but not limited thereto.

The aforementioned VR/CS also manages the user-centric mobile user registrations comprising the mobile user identifier (ID) unifying and integrating mobile user personal communication identifier (ID), mobile user personal identifier (ID), mobile telephone number, mobile user domain address, mobile security identifier (or called Mobile DNA), or any identifier (ID) which the mobile user prefers, but not limited thereto. Based on the aforementioned and further below-mentioned mobile cloud infrastructure, the future wireless and wireline networks will be totally converged and integrated into an open architecture service delivery platform wherein ONE device, ONE number supporting multiple networks will become reality. Such user-centric communication registration (rather than the traditional carrier-centric closed telephone number registration) will enable truly user-preferable and truly service-oriented PERSONAL Communication architecture for the open convergence of multiple networks, both wireline and wireless networks. The aforementioned various mobile user registration identifiers are generally referred to the user-centric "Mobile User ID" by default in the present invention, but not limited thereto.

The aforementioned user-centric Mobile User ID managed in the aforementioned VR/CS is a very user-friendly communication ID, independent to the specific wireless or wireline networks, wherein, the specific transmission address in the specific networks may be mapped, encoded or calculated from the aforementioned Mobile User ID, but fully separated and independent from the mobile users. Therefore, the mobile users do not have to change the aforementioned Mobile User ID across various different networks including both wireline and wireless networks, in the future service-oriented network convergence infrastructure.

The aforementioned VR/CS manages the switching of various calls including voice, data, video and messages, but not limited thereto. For the aforementioned network selection to the multiple cellular mobile networks (carriers), the aforementioned VR/CS negotiates with such multiple cellular mobile networks based on the criteria as set forth above.

The aforementioned multiple cellular mobile networks can converge or merge into a unified cellular mobile network to optimize the open mobile cloud infrastructure.

The aforementioned mobile terminal by Open Wireless Architecture (OWA) may connect to the networks (wireline networks or wireless networks) either through IP/PDM connection (IP over wireline network, IP over WLAN, IP over WPAN, IP over BWA or IP over Cellular mobile network) or through Non-IP cellular mobile network.

The Virtual Mobile Server and the VR/CS, as set forth above, connect to the backbone Internet through IP or PDM connection, and the aforementioned mobile terminal becomes the mobile cloud client once connected and synchronized with the aforementioned virtual mobile server through IP or PDM connection. All wireless networks disclosed in FIG. 1 connect to the backbone Internet through IP or PDM connections.

The aforementioned mobile terminal can be any wireless or mobile terminal equipment of mobile Internet, Internet of Things (IoT), Cyber Physical Systems, Ubiquitous networks, Sensor networks, but not limited thereto.

FIG. 5 shows the incoming Mobile Call Processing Management in the Virtual Register and Call Switch (VR/CS), associated with the mobile terminal of the present invention, wherein the key control procedures are:

Firstly, the aforementioned VR/CS checks whether the mobile terminal has requested VR/CS to reroute its incoming call (voice, data, video or message call) to the virtual mobile server (main server(s) with Internet connection of home IP address(s)), as set forth above, without connecting to the mobile terminal. This request is necessary when the mobile terminal does not have a high-speed IP connection, but the incoming call contains large big file or long video file, etc, or when the mobile terminal is busy and does not want to accept new calls consuming too much wireless bandwidth or system resources, etc. If no such rerouting request is received in the aforementioned VR/CS, then it proceeds to the next step.

The Connection Table (Conn_Table) is frequently updated by the mobile terminal, synchronized with the aforementioned virtual mobile server, as set forth above, through specific network connections, wherein "Visitor IP address" is reported in case of wired network connection or short range wireless access connection (for example, WLAN or WPAN) or broadband wireless access network connection based on IP connection as well as in some situations, the cellular mobile networks in slow mobile, slow fading and/or stable radio transmission environment wherein IP over cellular mobile is possible. If there are no such IP connections available with the aforementioned mobile terminal, the VR/CS, as set forth above, together with associated mobile switching center (or gateway) and base station, communicates with this mobile terminal over the cellular mobile networks, for example, CDMA networks, TDMA networks or OFDM networks, but not limited thereto, wherein the specific cellular air-link channel address is reported to the aforementioned Connection Table.

When the aforementioned mobile terminal reports the aforementioned Visitor IP address to the aforementioned VR/CS and further synchronize with the aforementioned VMS, the global equipment identifier (ID) (such as global mobile phone ID or global mobile device ID, etc) of the aforementioned mobile terminal is thereby reported to the aforementioned VMS to link to the aforementioned Visitor IP address in order to trace the aforementioned mobile terminal in different IP networks of the aforementioned IP connection. This is very useful to trace the terminal equipment when the aforementioned mobile terminal gets lost, stolen or unauthorized use, but not limited thereto.

When an incoming mobile call (including voice, data, video and message call) is received and there is no rerouting request (rerouting to virtual mobile server) from the mobile terminal, the aforementioned VR/CS searches the Connection Table associated with the called mobile terminal (or the destination mobile terminal in this case) of the present invention. If a Visitor IP address is found, the VR/CS dials or re-synchronizes this IP address, through IP Call Switch in VR/CS (or other IP system in different infrastructure), to establish the IP connection accordingly. If this Visitor IP address is not available, and the regular cellular mobile link address (for example, CDMA, TDMA or OFDM channel address) is found and associated with the called destination mobile terminal number, the VR/CS switches to the associated cellular network and connects the associated mobile switching center (or gateway) and base station to establish the communication with the destination mobile terminal, as set forth above, over the cellular mobile air link. This cellular mobile channel can be either static channel or dynamically assigned channel to optimize the wireless spectrum utilization.

Based on the radio propagation model (fast-fading or slow-fading), terminal mobile speed (fast seamless mobile or slow mobile) and radio transmission environment (stable or unstable), the aforementioned cellular mobile communication link can be either IP connection or non-IP connection.

However, it is emphasized that the OWA mobile cloud infrastructure of the present invention utilizes the terms "mobile switching center, mobile gateway, base station, etc", which in the context of the present invention, is meant to include the aforementioned existing CDMA system, TDMA/GSM system, OFDM system, or any other mobile communication infrastructure utilizing different network topology and/or network architecture with different terms which may or may not have all of the functional characteristics of existing CDMA or TDMA or OFDM standards. As such, the OWA mobile cloud infrastructure of the present invention is not meant to be limited to current mobile cellular communication infrastructure, and the subsequent specific description utilization and explanation of certain characteristics previously recited as being characteristics of a mobile switching center or base station or mobile gateway or mobile router are not intended to be limited to such technology.

If after searching the Connection Table, as set forth above, both Visitor IP address and cellular mobile link address (including CDMA or TDMA or OFDM channel) are not found, the aforementioned VR/CS has to forward the incoming call, over IP connection, to the aforementioned virtual mobile server, wherein a fixed Home IP address is stored in the aforementioned Connection Table.

Therefore, the incoming mobile call processing management in VR/CS (or any Mobile Gateway, Mobile Switch in different terms) of the present invention requires the minimum modification of the existing mobile communication infrastructure.

The aforementioned mobile terminal of the present invention searches for the access networks in the priority order of Wired network, Wireless LAN (WLAN), Wireless PAN (WPAN), Wireless MAN (or called BWA), TDMA, CDMA and OFDM, for example but not limited to, to maximize the wireless spectrum utilization efficiency and broadband services. However, this access control order can be re-defined by the mobile user with the mobile terminal of the present invention. Additionally, the OWA mobile terminal of the present invention has the function to frequently search for the higher priority network access mode whenever the connection is in the low priority mode to optimize the network access control for the mobile terminal of the present invention.

The cellular mobile networks may include IP connection for slow-mobile, slow-fading and/or stable radio transmission environment, and non-IP traditional circuit-switched wireless connection if the mobile speed is too fast or the radio propagation model is of fast-fading.

Based on different underlying physical transmission mediums, the IP connection of the aforementioned mobile terminal can be IP over wireline, IP over WLAN, IP over WPAN, IP over BWA or IP over Cellular Mobile, but not limited thereto.

The aforementioned IP connection refers to any connection of the Packet Division Multiplexed (PDM) networks including IP network and other packet-switched networks. By default in the present invention, PDM refers to IP or other packet-switched connections.

When multiple cellular networks are available for the aforementioned mobile terminal to select the optimal cellular mobile link(s), either in IP connection or in non-IP connection, the selection method of cellular networks is based on the overall criteria of Best-of-Effort, Simplicity and Convergence, Inter-networking QoS (quality of service), Network Performance, Cost Effectiveness and Customer Services for each mobile user, but not limited thereto. Such network selection table is maintained in the Network Access Optimizer of the aforementioned VR/CS, synchronized with the virtual mobile server, as set forth above.

Whenever an IP connection is available, the aforementioned mobile terminal synchronizes with the virtual mobile server in a real-time and optimized manner.

The aforementioned IP Connection is selected and optimized by the aforementioned Mobile Terminal in the default priority order of IP over wireline network, IP over WLAN, IP over WPAN, IP over BWA and IP over cellular mobile network, as set forth above, to maximize the wireless spectrum utilization efficiency, but the aforementioned priority order can be changed by the aforementioned mobile user.

The aforementioned IP Connection for the aforementioned mobile terminal can be roamed among IP networks of wireline network, WLAN, WPAN, BWA and cellular mobile network, as set forth above, in the aforementioned priority order when the aforementioned mobile terminal of the aforementioned mobile user moves across different IP networks, as set forth above.

The Call Switch unit in the aforementioned VR/CS manages the IP connecting and Non-IP connecting functions.

The Mobile User Registration in the aforementioned VR/CS includes Mobile User Identifier (ID), Mobile User's Connection Table, Mobile User's Virtual Mobile Sever IP Address.

The aforementioned mobile terminal can connect to other mobile terminals in an Ad-Hoc or Mesh network manner, synchronized by the aforementioned VR/CS and the aforementioned VMS whenever the aforementioned IP connection is available.

The aforementioned mobile terminal can seamlessly roam among WLAN, WPAN, BWA and cellular mobile network, as set forth above, synchronized by the aforementioned VR/CS and the aforementioned VMS whenever the aforementioned IP connection is available.

In summary, the aforementioned Open Wireless Architecture (OWA) Mobile Cloud method comprises:
a) If the aforementioned Mobile Terminal of the aforementioned mobile user has an IP (internet protocol) Connection established, it reports its Visitor IP address to its corresponding Virtual Register and Call Switch (VR/CS), as set forth above, and the aforementioned Mobile Terminal can connect with backbone Internet network and synchronize with its corresponding Virtual Mobile Server (VMS), as set forth above, through the aforementioned IP Connection, and
b) If the aforementioned Mobile Terminal does not have the aforementioned IP Connection established, it connects to the aforementioned VR/CS through specific Non-IP cellular mobile link selected, optimized and managed by the aforementioned VR/CS.

FIG. 6 introduces to utilize a computer server(s) either in the server center or data center, with Internet access, as a Virtual Mobile Server for the mobile terminal of the present invention, wherein the key disclosures are:

The Virtual Mobile Server, basically a Computer Server, has a fixed Home IP address or an assigned roaming IP address by the aforementioned Home IP address, connecting to the wireline Internet through Fibre, Cable Modem, Ethernet or DSL (Digital Subscriber Loop), but not limited thereto. This virtual mobile server becomes the mobile cloud server for one or multiple mobile terminals, as set forth above, which become the mobile cloud clients.

The aforementioned Virtual Mobile Server(s) supporting group or many of aforementioned mobile terminals can locate in the computer servers' center or in the network data center.

The Virtual Mobile Server, as set forth above, comprises an important Terminal Processing Unit in operating the OWA Interface processing, Signal processing, Application processing and Networking processing for the mobile terminal, as set forth above. The abovementioned Virtual Mobile Server tries to handle the processing tasks for the mobile terminal, as set forth above, as much as possible when the IP connection is established between them in order to simplify the system implementation and improve the system performance of the mobile terminal, as set forth above.

The aforementioned Terminal Processing Unit further operates the following functions with the aforementioned mobile terminal: bandwidth optimization and synchronization, signals synchronization, applications synchronization as well as network optimization and synchronization.

The aforementioned Terminal Processing Unit connects to the aforementioned mobile terminal through traditional IP connection, improved IP connection such as IPv6 or other Packet Division Multiplexed (PDM) network connection.

The Virtual Mobile Server, as set forth above, maintains a synchronized and real-time copy of the aforementioned Connection Table from the aforementioned Virtual Register and Call Switch (VR/CS).

The Virtual Mobile Server, as set forth above, also synchronizes with the aforementioned mobile terminal when the IP connection is established between them.

One Virtual Mobile Server, as set forth above, can support one or multiple or group of mobile terminals of the present invention, wherein many such mobile terminals can share the same Virtual Mobile Server, as set forth above.

The Virtual Mobile Server, as set forth above, supports such important services and applications as "Network Optimization", "Mobile Relations", "Mobile Applications", "Mobile Internet Optimization", "Mobile Internet Applications", "Voice/Video server", "Short Message Service (SMS) and Multimedia Message Service (MMS) server", "Game Center", "Data Center" "SDM Center", etc., but not limited thereto.

The aforementioned Mobile Applications unit and Data Centers are utilized to host mobile application platforms, on-line stores, on-line servers, cloud servers, development suites, users data and application data, but not limited thereto.

The aforementioned Mobile Internet Optimization module processes the improved mobile Internet browsing, searching, networking, accelerating, computing and other applications for the aforementioned mobile terminal either in the synchronized mode when the IP connection is available, or in the unsynchronized mode when the IP connection is not available.

The aforementioned Network Optimization module processes the cellular network selection and network access optimization for each mobile user wherein the network access table is updated and synchronized with the aforementioned VR/CS real-timely.

The Virtual Mobile Server, as set forth above, also provides the mobile terminal of the present invention of Special Services Management such as Location management, Emergency call management, Security and Safety management, Sensor Networks and Systems management, Services Optimization, Digital spectrum management, and mobile cloud Operation and Maintenance management, etc., but not limited thereto.

The Virtual Mobile Server, as set forth above, can manage the aforementioned mobile terminal(s) to organize a sensor networks when the IP connection is available between the virtual mobile server and the mobile terminal(s), as set forth above.

The Virtual Mobile Server, as set forth above, can manage or control one or multiple aforementioned mobile terminal(s) connect to another or other multiple aforementioned mobile terminal(s) in an Ad-Hoc or Mesh network manner when the IP connection is available among them.

The mobile terminal, as set forth above, frequently reports its current terminal IP address (or called Visitor IP address) to the aforementioned virtual mobile server when the IP connection is established, and this aforementioned terminal IP address is updated in the aforementioned virtual mobile server when the aforementioned mobile terminal moves to different access point of wired network, wireless LAN, wireless PAN or wireless MAN (or called BWA) or some cellular mobile networks with IP connection.

The synchronized IP or PDM link between the mobile terminal and the virtual mobile server, as set forth above, include IP over WLAN, IP over WPAN, IP over BWA and IP over Cellular Mobile network, but not limited thereto.

Lastly, any computer server or network server with Internet connection and with an IP address can be configured to be an aforementioned Virtual Mobile Server, associated with the mobile terminal(s) of the present invention.

The OWA Virtual Mobile Server as the Mobile Cloud Server of the present invention is not meant to be limited to the aforementioned system architecture, and the subsequent specific description utilization and explanation of certain characteristics previously recited as being characteristics of this system architecture are not intended to be limited to such technologies.

The Mobile User Identifier (ID) can be mobile user's telephone number, mobile user's personal ID, mobile user's domain name or other defined ID information, but not limited thereto.

FIG. 7 describes the OWA Application Optimizer in the OWA mobile terminal system of the present invention.

To simplify the mobile terminal design and implementation, it is necessary to move the processing tasks out of the mobile terminal system, and to the mobile cloud server which in the present invention called virtual mobile server. Application processing including video processing, multimedia processing, gaming processing, mobile Internet processing, but not limited thereto, consumes much processing power and system resources for the mobile terminal, and therefore degrades the system performance.

When a high-speed IP connection is established between the aforementioned mobile terminal and the aforementioned virtual mobile server, the aforementioned OWA Application Optimizer moves the rich applications (large data, video, big file, web, multimedia, etc) processing tasks remotely to the aforementioned virtual mobile server for processing, then retrieve the processing results back to the aforementioned mobile terminal or save the results in the aforementioned virtual mobile server.

When the high-speed IP connection is not available between the aforementioned mobile terminal and the aforementioned virtual mobile server, the aforementioned OWA Application Optimizer limits the applications to voice, message, text and short web service locally in the aforementioned mobile terminal. In this case (low-speed IP connection or no IP connection is available), the aforementioned OWA Application Optimizer may request the aforementioned VR/CS or Mobile Gateway to reroute the incoming rich mobile call which consumes much processing power and/or transmission bandwidth, such as video call, big file, large data, etc, to the aforementioned virtual mobile server directly without proceeding to the aforementioned mobile terminal to save system and transmission resources. Then, after the IP connection with enough bandwidth is established between the aforementioned mobile terminal and the aforementioned virtual mobile server, the aforementioned mobile terminal can retrieve the incoming calls from the aforementioned virtual mobile server.

The IP connection, as set forth above, refers to the connection to the wireline network, wireless LAN, wireless PAN, wireless MAN (BWA) or some cellular mobile networks, as set forth above, which is a broadband high-speed connection to the Internet.

In summary, the present invention discloses the following discoveries of merits:

A classified relation networking optimization platform in open wireless architecture (OWA) mobile cloud terminal device comprises:

a) OWA OS (operating system) module managing optimized wireless connections for mobile terminal adaptively and intelligently based on QoW (Quality of Wireless connection) control, wherein the aforementioned OWA OS further comprises OWA Mobile Cloud client synchronizing with Virtual Mobile Server as Mobile Cloud Server and OWA Virtualization Sub-Layer supporting and scheduling various multiple radio transmission technologies (RTTs) including WLAN (wireless local area networks), WPAN (wireless personal access networks), BWA (broadband wireless access networks) and cellular mobile networks, and b) Networking Service OS module managing secured business networking, secured personal networking and unsecured social networking as well as managing various networking application services adaptively and intelligently through the aforementioned optimized wireless connections in the aforementioned OWA OS, wherein the aforementioned Networking Service OS further comprises Mobile Relation Manager scheduling the aforementioned networking application services including video service, web service and message/text service for the aforementioned business networking, the aforementioned personal networking and the aforementioned social networking adaptively controlled by the aforementioned OWA OS, and Mobile DNA (DeoxyriboNucleic Acid, simply referring to unique identifier) unit processing security DNA for the aforementioned secured business networking and the aforementioned secured personal networking.

The aforementioned Mobile Cloud client optimizes performance of the aforementioned mobile terminal in both wireless transmission and terminal system processing, and facilitates the aforementioned optimized wireless connections based on the aforementioned QoW considering cost, bandwidth and spectrum efficiency, as well as allocates processing tasks in the aforementioned mobile terminal to the aforementioned virtual mobile server as much as possible through the aforementioned optimized wireless connections for the aforementioned mobile terminal.

The aforementioned Mobile Relation Manager activates all of the aforementioned networking application services including the aforementioned video service, the aforementioned web service and the aforementioned message/text service for the aforementioned business networking, the aforementioned personal networking and the aforementioned social networking when high-speed IP (internet protocol) connection over the aforementioned WLAN, the aforementioned WPAN, the aforementioned BWA or the aforementioned Cellular mobile with required good the aforementioned QoW is available between the aforementioned mobile terminal and the aforementioned virtual mobile server, and the aforementioned Mobile Relation Manager limits the aforementioned business networking, the aforementioned personal networking and the aforementioned social networking to basic application services including basic web service with very limited bandwidth and the aforementioned message/text service when only non-IP connection over the aforementioned cellular mobile is available or slow IP connection with poor the aforementioned QoW is available between the aforementioned mobile terminal and the aforementioned virtual mobile server.

The aforementioned Networking Service OS provides a truly user-centric relation classification service layer fully independent to underlying specific wireless transmissions of the aforementioned RTTs, and the aforementioned OWA OS provides an open wireless access layer totally separating specific the aforementioned RTTs with higher layers including the aforementioned classification service layer and the aforementioned Networking Service OS.

Above the aforementioned classification service layer of the aforementioned Networking Service OS is an open Application layer with common or standard networking API (application programming interface) for the aforementioned business networking, the aforementioned personal networking and the aforementioned social networking, and the aforementioned open Application layer can be synchronized to the aforementioned virtual mobile server directly or indirectly through an office or home desktop computer or laptop computer.

The method of Mobile Relation Manager controlling relation management process comprises following steps:
 a) Checking if the aforementioned IP connection over the order of the aforementioned WLAN, the aforementioned WPAN, the aforementioned BWA or the aforementioned Cellular mobile is available or not, and if it is available, it going to Step (b), otherwise it limiting the aforementioned networking application services to the aforementioned basic application services including the aforementioned basic web service and the aforementioned message/text service for the aforementioned mobile terminal, and then moving to Step (c), wherein when the aforementioned IP connection is available, the aforementioned mobile terminal is synchronized with the aforementioned virtual mobile server,
 b) Checking if the aforementioned QoW is acceptable or not, and if it is acceptable, it enabling full the aforementioned networking application services of rich video service, rich web service and the aforementioned message/text service for the aforementioned mobile terminal, and then moving to Step (c), otherwise it enabling moderate application services of moderate web service and the aforementioned message/text only for the aforementioned mobile terminal, and then moving to Step (c), and
 c) Checking if the aforementioned secured business networking and/or the aforementioned secured personal networking are requested or not, and if they are or it is requested, then checking if QoS (Quality of Service) is acceptable or not, otherwise if not requested, it going directly to the aforementioned application layer of the aforementioned unsecured social networking, and if the aforementioned QoS is acceptable, it moving to the aforementioned Mobile DNA unit for security processing, then continuing to the aforementioned application layer of the aforementioned secured business networking and/or the aforementioned secured personal networking, otherwise it automatically shutting down secured networking services including the aforementioned secured business networking and the aforementioned secured personal networking because service quality is too poor to ensure required security performance, then going directly to the aforementioned application layer of the aforementioned unsecured social networking.

The aforementioned QoW is basically on combined consideration of cost, bandwidth and spectrum efficiency wherein a good QoW means a good transmission bandwidth with good cost-effectiveness and spectrum-efficiency including the aforementioned good QoW with the aforementioned IP connection over the aforementioned WLAN, and a poor QoW means a poor transmission bandwidth or poor cost-effectiveness though transmission bandwidth could be good, or poor spectrum efficiency, including the aforementioned poor QoW with the aforementioned IP connection over the aforementioned cellular mobile but costing too much for mobile user of the aforementioned mobile terminal, wherein the aforementioned cellular mobile includes TDMA (time division multiplex access), CDMA (code division multiplex access), OFDM (orthogonal frequency division multiplex) and PDMA (packet division multiplex access).

The aforementioned QoS is based on standard service quality performance including bandwidth, latency or delay, jitter or variation in delay, synchronization, packet loss ratio and packet error ratio.

The aforementioned QoW and the aforementioned QoS controls can fully ensure user-centric instead of carrier-centric mobile relation management of the aforementioned secured business networking and the aforementioned secured personal networking for the aforementioned mobile user with the aforementioned mobile terminal.

The aforementioned QoW requirements of the aforementioned combined consideration of cost, bandwidth and spectrum efficiency can be preset by the aforementioned mobile user, and can be reset, updated or changed by the aforementioned mobile user for the aforementioned mobile terminal.

The aforementioned secured business networking and the aforementioned secured personal networking refer to enhanced security measures by the aforementioned Mobile DNA across the aforementioned wireless access layer, the aforementioned classification service layer and the aforementioned application layer for the aforementioned business networking and the aforementioned personal networking between the aforementioned mobile terminal and the aforementioned virtual mobile server, and the aforementioned unsecured social networking refers to regular measure without the aforementioned Mobile DNA processing across the aforementioned wireless access layer, the aforementioned classification service layer and the aforementioned application layer for the aforementioned social networking between the aforementioned mobile terminal and the aforementioned virtual mobile server.

The aforementioned QoW is automatically calculated and updated by the aforementioned optimized wireless connections of the aforementioned mobile terminal in a preset automatic connection optimization order, from highest to lowest, of the aforementioned WLAN, the aforementioned WPAN, the aforementioned BWA and the aforementioned cellular mobile, but the aforementioned automatic connection optimization order can be reset or changed by mobile user, and the aforementioned updated QoW adaptively synchronizes with the aforementioned Mobile Relation Manager and the aforementioned Mobile DNA unit in the aforementioned Networking Service OS to optimize networking and service performance of the aforementioned business networking, the aforementioned personal networking and the aforementioned social networking.

The aforementioned rich video service refers to long and/or large video service consuming considerable bandwidth for the aforementioned mobile terminal; the aforementioned rich web service refers to large files, big data and/or multimedia service consuming considerable bandwidth for the aforementioned mobile terminal; the aforementioned moderate web service refers to regular file, data, picture, photo, image and regular web information consuming normal or much less bandwidth for the aforementioned mobile terminal, and the aforementioned basic web service refers to basic web information of basic text-based content, small images, small photos and small files with very limited bandwidth for the aforementioned mobile terminal.

The aforementioned OWA OS simplifies the aforementioned mobile terminal by moving much processing tasks to the aforementioned virtual mobile server and optimizing wireless connections through the aforementioned virtual mobile server, and the aforementioned Networking Service OS simplifies the aforementioned relation networking for the aforementioned mobile terminal by adaptively classifying into the aforementioned secured business networking, the aforementioned secured personal networking and the aforementioned unsecured social networking between the aforementioned mobile terminal and the aforementioned virtual mobile server, wherein the aforementioned virtual mobile server operates and maintains complete and full the aforementioned relation networking services for the aforementioned mobile terminal, but the aforementioned mobile terminal is provided with simplified the aforementioned relation networking services automatically controlled and optimized by the aforementioned OWA OS and synchronized with the aforementioned virtual mobile server.

The aforementioned Mobile DNA unit can be simplified, reduced, compressed or reconfigured subject to adaptive control of the aforementioned OWA OS to optimize whole system performance of the aforementioned mobile terminal both in wireless connections based on the aforementioned QoW and in wireless services based on the aforementioned QoS.

The aforementioned Mobile DNA unit comprises:

a) Uplink security unit managing security processing from the aforementioned mobile terminal to the aforementioned virtual mobile server, further comprising:
  i. Personal and Business DNA Encoder, to encode user information, device information and content information into a DNA code or sequence wherein the aforementioned DNA Encoder can be through multidimensional matrix operation by the aforementioned user information including user ID (identifier), user name, user SSN (social security number), user FP (fingerprint), user PIN (personal identification number), the aforementioned device information including device ID, device GID (global identification), device SIM (subscriber identity module), device SN (serial number) with the aforementioned content information including content title, content author, content copyright, content ISSN (international standard serial number), content ISBN (international standard book number) or through matrix operation of user parameters, network parameters, transmission parameters, device parameters with the aforementioned content information,
  ii. Module of Fingerprinting DNA into Contents, to fingerprint the aforementioned DNA code into user contents including video, web and message/text and generate integrated information stream or data, wherein the aforementioned fingerprinting DNA can be content-based fingerprinting with the aforementioned DNA code, watermark fingerprinting with the aforementioned DNA code, security coded fingerprinting with the aforementioned DNA code or user-defined fingerprinting with the aforementioned DNA code,
  iii. Security Encryption module, to encrypt fingerprinted contents to generate secured information output wherein the aforementioned security encryption can use standard or common encryption method or user-defined encryption algorithm, and
b) Downlink security unit managing security processing from the aforementioned virtual mobile server to the aforementioned mobile terminal, further comprising:
  i. Security Decryption module, to decrypt received secured information input to restore the aforementioned fingerprinted contents wherein the aforementioned security decryption can use standard or common decryption method or user-defined decryption algorithm,
  ii. Module of Tracking and Detecting DNA from received contents, module of Personal and Business DNA Decoder and DNA Match and Authorization module, to detect and decode correct the aforementioned DNA code from the aforementioned received fingerprinted contents, wherein the aforementioned module of Tracking and Detecting DNA is utilized to filter out the aforementioned DNA code from the aforementioned received contents, the aforementioned DNA Match and Authorization module is utilized to check whether it is an authorized DNA or a fake DNA or an unauthorized DNA by searching authorized DNA database in the aforementioned mobile terminal synchronized with the aforementioned virtual mobile server, and the aforementioned Personal and Business DNA Decoder is utilized to decode the aforementioned DNA code into the aforementioned user information, the aforementioned device information and the aforementioned content information, iii. Content Claim module, to claim and generate original contents from the aforementioned received fingerprinted contents by the aforementioned detected and authorized DNA code, wherein the aforementioned original contents include original video, original web and original message/text.

The aforementioned DNA Encoder, the aforementioned Fingerprinting DNA module and the aforementioned Security Encryption module generate secured information frame to be transmitted securely from the aforementioned mobile terminal to the aforementioned virtual mobile server or the aforementioned mobile cloud server, and the aforementioned virtual mobile server connects directly to wireline backbone networks and so can forward, distribute, reroute, dispatch or switch the aforementioned secured information frame by the aforementioned Mobile DNA to other the aforementioned mobile terminals either inside same wireless network or outside the aforementioned same wireless network or to any other networks through the aforementioned wireline backbone network or through global Internet to construct end-to-end secured networking including the aforementioned secured business networking and the aforementioned secured personal networking, among different the aforementioned mobile terminals, through the aforementioned secured information frame by the aforementioned Mobile DNA, synchronized with the aforementioned virtual mobile server.

The aforementioned DNA Decoder and the aforementioned Contents Claim can be inverse or reverse operations of the aforementioned DNA Encoder and the aforementioned Fingerprinting DNA into Contents, and the aforementioned DNA Tracking and Detecting can be content-based DNA detection.

The aforementioned DNA code is a mathematic function of the aforementioned user information, the aforementioned device information and the aforementioned content information, but can be simplified, reduced, shortened, compressed or omitted in different applications wherein the aforementioned content information can be omitted in simple applications such as applications with low-level security requirement or just using the aforementioned DNA code as secured networking ID or secured mobile ID.

The aforementioned DNA Match and Authorization facilitates effective blocking of unnecessary contents including virus, spam, spyware, advertisement from coming to the aforementioned mobile terminal by matching the aforementioned detected DNA code with the aforementioned DNA database to protect security and optimize performance for the aforementioned business networking and the aforementioned personal networking.

The aforementioned OWA OS module can be applied to different wireless applications such as mobile wireless communication devices, mobile smartphones, mobile computing devices and wireless cyber physical systems (CPS) with many wireless sensor devices and networking devices.

The aforementioned OWA OS discovers, rules and schedules different RTTs, as set forth above, for billions of the aforementioned cyber physical system (CPS) devices and the aforementioned mobile devices connecting to the aforementioned Mobile Cloud server wirelessly.

The aforementioned Networking Service OS is an open module, adaptable to any common CRM (customer relation manager) platform or social networking platform.

The aforementioned Networking Service OS and OWA OS are open portable modules which can be installed in different systems in different application environments.

The aforementioned Networking Service OS provides secured mobile relation management of business networking, personal networking and social networking among different mobile terminal devices through virtual mobile server, as set forth above. The aforementioned Networking Service OS facilitates secured networking services between mobile terminal and virtual mobile server, as set forth above, and can further relay, reroute or switch to other mobile terminal synchronized with the aforementioned virtual mobile server. The aforementioned one virtual mobile server can support one or multiple mobile terminals, and multiple mobile terminals can share one virtual mobile server in the aforementioned secured networking service.

The aforementioned Mobile DNA contains unique user information, device information and content information, and can extend to low-layer security information including transmission information, MAC (medium access control) information and/or IP (Internet Protocol) information to enhance the security measures from higher-layers to lower-layers for the mobile terminal, as set forth above.

The aforementioned OWA OS is to converge and manage various RTTs (wireless air interfaces) for the mobile terminal in a cost-effective and spectrum-efficient way for the future user-centric mobile communications.

The aforementioned Networking Service OS is an open service OS module optimized for the mobile wireless terminal device, but can be utilized for other systems such as mobile wireless router, mobile wireless gateway, mobile wireless switching system or mobile wireless base station.

The aforementioned OWA OS is an open wireless OS module optimized for the mobile wireless terminal device, but can be utilized for other wireless systems such as mobile wireless router, mobile wireless gateway, mobile wireless switching system or mobile wireless base station.

The aforementioned OWA OS and Networking Service OS work together to construct the strong security measure, security pipe and security firewall for mobile terminals against any virus, cyber-attack and spam from the physical layer to MAC layer to network layer to service layer in addition to application layer, fully protected through and synchronized with the aforementioned virtual mobile server in the mobile cloud infrastructure.

The aforementioned Mobile DNA, if carrying or containing lower-layer wireless transmission channel information and/or MAC information, can provide very strong secured measures for the mobile terminal in the aforementioned secured business networking and secured personal networking in the wireless over-the-air connections.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A classified social relation networking optimization platform system in open wireless architecture (OWA) mobile cloud terminal device, said system comprising:
   1) OWA OS (operating system) module comprising hardware and software for selecting optimized wireless connections for mobile terminal adaptively and intelligently based on QoW (Quality of Wireless connection) control, wherein said OWA OS module further supports said mobile terminal as OWA Mobile Cloud client synchronizing with Virtual Mobile Server as OWA Mobile Cloud Server wherein both said OWA Mobile Cloud client and said OWA Mobile Cloud Server support and schedule various multiple radio transmission technologies (RTTs) including WLAN (wireless local area networks), WPAN (wireless personal access networks), BWA (broadband wireless access networks) and cellular mobile networks,
2) Networking Service OS module selecting said social relation networking including secured business networking, secured personal networking and unsecured social networking as well as selecting various social relation networking application services adaptively and intelligently through said optimized wireless connections in said OWA OS module, wherein said Networking Service OS module further comprises Mobile Relation Manager scheduling said social relation networking application services including video service, web service and message/text service for said business networking, said personal networking and said social networking adaptively controlled by said OWA OS module, and Mobile Unique Identifier (UID) unit processing mobile security identifiers for said secured business networking and said secured personal networking, wherein, said OWA OS module simplifies said mobile terminal by moving processing tasks to said virtual mobile server, and said Networking Service OS module simplifies social relation networking for said mobile terminal by classifying said social relation networking into said secured business networking, said secured personal networking and said unsecured social networking for said mobile terminal with said virtual mobile server, wherein said virtual mobile server operates and maintains complete social relation networking services for said mobile terminal, and said social relation networking services are automatically controlled and optimized by said OWA OS module and synchronized with said virtual mobile server, said OWA OS module discovers, rules, schedules, converges and manages different said RTTs, said QoW is based on combined consideration of cost, bandwidth and spectrum efficiency wherein an acceptable QoW means a good transmission bandwidth with good cost-effectiveness and spectrum-efficiency including said acceptable QoW with IP (Internet Protocol) connection over said WLAN, and an unacceptable QoW means a poor transmission bandwidth or poor cost-effectiveness though transmission bandwidth could be good, or poor spectrum efficiency, including said unacceptable QoW with said IP connection over said cellular mobile networks but costing too much for mobile user of said mobile terminal, wherein said cellular mobile networks include TDMA (time division multiplex access), CDMA (code division multiplex access), OFDM (orthogonal frequency division multiplex) and PDMA (packet division multiplex access), said QoW is utilized for wireless connections for said OWA OS module, and said Mobile Relation Manager provides a method of controlling relation management process, said method comprising:

a) Checking if IP (Internet Protocol) connection over said WLAN, said WPAN, said BWA or said cellular mobile networks is available or not for said mobile terminal, and if said IP connection is available, the process going to Step (b), otherwise the process limiting said social relation networking application services to basic application services including basic web service and said message/text service for said mobile terminal, and then moving to Step (c), wherein when said IP connection is available for said mobile terminal, said mobile terminal is synchronized with said virtual mobile server, b) Checking if said QoW is acceptable or not for said mobile terminal, and if it is acceptable, it enabling full said social relation networking application services of rich video service, rich web service and said message/text service for said mobile terminal, and then moving to Step (c), otherwise it enabling moderate application services of moderate web service and said message/text only for said mobile terminal, and then moving to Step (c), and c) Checking if said secured business networking and/or said secured personal networking are requested or not for said mobile terminal, and if they are or it is requested, then checking if QoS (Quality of Service) is acceptable or not for said mobile terminal, otherwise if said secured business networking or said secured personal networking is not requested, the process going directly to said unsecured social networking, and if said QoS is acceptable, the process moving to said Mobile UID unit for security processing, then continuing to said secured business networking and/or said secured personal networking, otherwise the process automatically shutting down secured networking services including said secured business networking and said secured personal networking because service quality is too poor to ensure required security performance, then the process going directly to said unsecured social networking.

2. The system as recited in claim 1, wherein said OWA Mobile Cloud client optimizes wireless transmission performance and terminal system processing performance of said mobile terminal, and facilitates said optimized wireless connections based on said QoW considering cost, bandwidth and spectrum efficiency, as well as allocates processing tasks in said mobile terminal to said virtual mobile server through said optimized wireless connections for said mobile terminal.

3. The system as recited in claim 1, wherein said Mobile Relation Manager activates all of said social relation networking application services including said video service, said web service and said message/text service for said business networking, said personal networking and said social networking when high-speed IP (internet protocol) connection over said WLAN, said WPAN, said BWA or said cellular mobile networks with required acceptable said QoW is available between said mobile terminal and said virtual mobile server, and said Mobile Relation Manager limits said business networking, said personal networking and said social networking to basic application services including basic web service with very limited bandwidth and said message/text service when only non-IP connection over said cellular mobile networks is available or slow IP connection with unacceptable said QoW is available between said mobile terminal and said virtual mobile server.

4. The system as recited in claim 1, wherein said Networking Service OS module provides an user-centric relation classification service layer independent to underlying specific wireless transmissions of said RTTs, and said OWA OS module provides an open wireless access layer separating specific said RTTs with higher layers including said classification service layer and said Networking Service OS module.

5. The system as recited in claim 4, wherein above said classification service layer of said Networking Service OS module is an open Application layer with common or standard networking API (application programming interface) for said business networking, said personal networking and said social networking, and said open Application layer is synchronized to said virtual mobile server directly or indirectly through desktop computer or laptop computer in office or at home.

6. The system as recited in claim 1, wherein said QoS is based on standard service quality performance including bandwidth, latency or delay, jitter or variation in delay, synchronization, packet loss ratio and packet error ratio.

7. The system as recited in claim 1, wherein said QoW and said QoS controls can fully ensure user-centric instead of carrier-centric mobile relation management of said secured business networking and said secured personal networking for said mobile user with said mobile terminal.

8. The system as recited in claim 1, wherein said QoW requirements of said combined consideration of cost, bandwidth and spectrum efficiency can be preset by said mobile user, and can be reset, updated or changed by said mobile user for said mobile terminal.

9. The system as recited in claim 1, wherein said secured business networking and said secured personal networking provide enhanced security measures by said Mobile UID unit across wireless access layer, classification service layer and application layer for said business networking and said personal networking between said mobile terminal and said virtual mobile server, and said unsecured social networking provides regular measure without said Mobile UID unit across said wireless access layer, said classification service layer and said application layer for said social networking between said mobile terminal and said virtual mobile server.

10. The system as recited in claim 1, wherein said QoW is automatically calculated and updated by said optimized wireless connections of said mobile terminal in a preset order for automatic connection optimization, from highest to lowest, of said WLAN, said WPAN, said BWA and said cellular mobile networks, but the order for said automatic connection optimization can be reset or changed by mobile user, and the updated said QoW is synchronously reported to said Mobile Relation Manager and said Mobile UID unit in said Networking Service OS module to optimize networking and service 5 performance of said business networking, said personal networking and said social networking.

11. The system as recited in claim 1, wherein said rich video service refers to long and/or large video service consuming considerable bandwidth for said mobile terminal;
said rich web service refers to large files, big data and/or multimedia service consuming considerable bandwidth for said mobile terminal; said moderate web service refers to regular file, data, picture, photo, image and regular web information consuming normal or much less bandwidth for said mobile terminal, and said basic web service refers to basic web information of basic text-based content, small images, small photos and small files with very limited bandwidth for said mobile terminal.

12. The system as recited in claim 1, wherein said Mobile UID unit can be simplified, reduced, compressed, reconfigured or extended subject to control from said OWA OS module to optimize whole system performance of said mobile terminal both in wireless connections based on said QoW and in wireless services based on said QoS.

13. The system as recited in claim 1, wherein said Mobile UID unit comprising:
a) Uplink security unit managing security processing from said mobile terminal to said virtual mobile server, further comprising:
i. Personal and Business UID Encoder, to encode user information, device information and content information into a UID code or UID sequence wherein said UID Encoder is implemented through multidimensional matrix operation by said user information including user ID (identifier), user name, user SSN (social security number), user FP (fingerprint) and user PIN (personal identification number), said device information including device ID, device GID (global identifier), device SIM (subscriber identity module) and device SN (serial number) with said content information including content title, content author, content copyright, content ISSN (international standard serial number) and content ISBN (international standard book number),
ii. Module of Fingerprinting Contents with UID, to fingerprint original contents including video, web and message/text with said UID code, and generate fingerprinted contents, wherein fingerprinting method can be watermark fingerprinting with said UID code, security encoded fingerprinting with said UID code or user-defined fingerprinting with said UID code,
iii. Security Encryption module, to encrypt fingerprinted contents to generate secured information output wherein said security encryption module uses standard or common encryption method or user-defined encryption algorithm, and
b) Downlink security unit managing security processing from said virtual mobile server to said mobile terminal, further comprising:
i. Security Decryption module, to decrypt received secured information input to restore said fingerprinted contents wherein said security decryption module uses standard or common decryption method or user-defined decryption algorithm,
ii. Module of Tracking and Detecting UID from received contents, Personal and Business UID Decoder and UID Match and Authorization module, to track, detect and decode said UID code from received said fingerprinted contents, wherein said module of Tracking and Detecting UID from received contents is utilized to filter out said UID code from said received contents, said UID Match and Authorization module is utilized to check whether detected UID is an authorized UID or a fake UID or an unauthorized UID by searching authorized UID database through said virtual mobile server for said mobile terminal, and said Personal and Business UID Decoder is utilized to decode said UID code into said user information, said device information and said content information,
iii. Content Claim module, to claim and restore original contents from received said fingerprinted contents with detected and authorized said UID code, wherein said original contents include original video, original web and original message/text.

14. The system as recited in claim 13, wherein said UID Encoder, said module of Fingerprinting Contents with UID and said Security Encryption module generate secured information frame to be transmitted securely from said mobile terminal to said virtual mobile server, and said virtual mobile server connects directly to wireline backbone networks and so can forward, distribute, reroute, dispatch or switch said secured information frame to other said mobile terminal of any network through said wireline backbone networks or through global Internet to construct end-to-end secured social relation networking including said secured business networking and said secured personal networking among different mobile terminals, synchronized with and controlled by said virtual mobile server.

15. The system as recited in claim 13, wherein said Personal and Business UID Decoder and said Content Claim module support inverse or reverse operations of said UID Encoder and said module of Fingerprinting Contents with UID.

16. The system as recited in claim 13, wherein said UID code is generated by a mathematic function with elements of said user information, said device information and said content information, but can be simplified, reduced, shortened, compressed, omitted or extended in different applications wherein said content information can be omitted in simple applications such as applications with low-level security requirement or by just using said UID code as secured networking ID or secured mobile ID, and said UID code can also be extended to contain low layer wireless information including wireless transmission channel information and/or wireless MAC (medium access control) information to provide enhanced security method in said mobile terminal for highly secured wireless social relation networking.

17. The system as recited in claim 13, wherein said UID Match and Authorization module facilitates effective blocking of unnecessary contents including virus, spam, spyware, advertisement from coming to said mobile terminal by matching detected said UID code with said authorized UID database to protect security and optimize performance for said business networking and said personal networking.

* * * * *